(12) United States Patent
Long

(10) Patent No.: US 7,293,621 B2
(45) Date of Patent: Nov. 13, 2007

(54) VEHICLE DRIVE SYSTEM WITH ENERGY RECOVERY SYSTEM AND VEHICLE MOUNTING SAME

(75) Inventor: Thomas Long, Fort Pierce, FL (US)

(73) Assignee: Charge-O-Matic Energy Recovery Devices, LLC, Port St. Lucie, FL (US)

( * ) Notice: Subject to any disclaimer, the term of this patent is extended or adjusted under 35 U.S.C. 154(b) by 429 days.

(21) Appl. No.: 10/236,928

(22) Filed: Sep. 9, 2002

(65) Prior Publication Data

US 2003/0221882 A1 Dec. 4, 2003

Related U.S. Application Data

(60) Provisional application No. 60/370,985, filed on Apr. 10, 2002.

(51) Int. Cl.
*B60L 11/16* (2006.01)
*B60K 25/10* (2006.01)

(52) U.S. Cl. ............... 180/165; 180/65.1; 180/65.3; 180/65.6; 180/65.7; 280/DIG. 5

(58) Field of Classification Search ............... 180/65.2, 180/165, 65.3, 65.4, 65.6
See application file for complete search history.

(56) References Cited

U.S. PATENT DOCUMENTS

| | | | |
|---|---|---|---|
| 1,162,593 A | 11/1915 | Fieux | |
| 1,335,249 A | 3/1920 | Leymarie | |
| 1,736,663 A | 11/1929 | Nelson | |
| 1,953,187 A | 4/1934 | Nakashian | |
| 2,137,574 A | 1/1938 | Kromer | |
| 2,803,151 A | 8/1957 | Clerk | |
| 2,935,899 A | 5/1960 | Nallinger | |
| 3,022,383 A | 2/1962 | Springer | |
| 3,327,546 A | 6/1967 | Gordon et al. | |
| 3,396,607 A | 8/1968 | Ross | |
| 3,445,991 A | 5/1969 | Hanson et al. | |
| 3,493,066 A * | 2/1970 | Dooley | 180/165 |
| 3,529,482 A | 9/1970 | Jackson et al. | |
| 3,530,356 A * | 9/1970 | Aronson | 320/117 |
| 3,613,814 A | 10/1971 | Prien, Jr. et al. | |
| 3,631,730 A | 1/1972 | Hadler et al. | |

(Continued)

*Primary Examiner*—Christopher P. Ellis
*Assistant Examiner*—Vaughn Coolman
(74) *Attorney, Agent, or Firm*—Tangent Law Group; Eric J. Weierstall, Esq.

(57) ABSTRACT

A drive system with at least one power storage device and at least one motor intermittently energized and de-energized through coupling to the at least one power storage device. The drive having at least one weighted drive member coupled to the at least one motor. An at least one energy recovery device returns energy to the at least one power storage device when the motor is energized or when the motor is de-energized by intermittently engaging the at least one drive member. The system also comprises a drive unit coupled to said at least one weighted drive member such that the motor drives the at least one weighted drive member which in turn drives the drive train wherein when the at least one weighted drive member is disengaged from the drive train. The motor can remain in an energized state or become de-energized and energy recovery through the at last one energy recovery device can continue to return energy to the power storage device so long as the weighted drive member is driven.

149 Claims, 14 Drawing Sheets

U.S. PATENT DOCUMENTS

| | | | |
|---|---|---|---|
| 3,665,788 A | 5/1972 | Nyman | |
| 3,667,304 A | 6/1972 | Puffer | |
| 3,672,244 A * | 6/1972 | Nasvytis | 477/37 |
| 3,749,194 A | 7/1973 | Bardwick, III | |
| 3,771,311 A | 11/1973 | Herbst | |
| 3,874,472 A * | 4/1975 | Deane | 180/65.4 |
| 3,878,913 A * | 4/1975 | Lionts et al. | 180/2.2 |
| 3,923,115 A * | 12/1975 | Helling | 180/65.2 |
| 4,010,407 A | 3/1977 | Lombard | |
| 4,018,052 A | 4/1977 | Laussermair | |
| 4,031,420 A | 6/1977 | Carini | |
| 4,075,542 A | 2/1978 | Szegedy | |
| 4,095,665 A | 6/1978 | Armfield | |
| 4,103,211 A | 7/1978 | Gardner et al. | |
| 4,131,171 A | 12/1978 | Keyes | |
| 4,233,858 A * | 11/1980 | Rowlett | 475/5 |
| 4,254,843 A * | 3/1981 | Han et al. | 180/165 |
| 4,309,620 A * | 1/1982 | Bock | 290/4 R |
| 4,329,889 A * | 5/1982 | Hachiya | 477/107 |
| 4,342,371 A | 8/1982 | Smitley | |
| 4,423,794 A | 1/1984 | Beck | |
| 4,477,764 A * | 10/1984 | Pollard | 320/116 |
| 4,498,552 A | 2/1985 | Rouse | |
| 5,125,469 A * | 6/1992 | Scott | 180/65.2 |
| 5,150,034 A | 9/1992 | Kyoukane et al. | |
| 5,172,784 A * | 12/1992 | Varela, Jr. | 180/65.4 |
| 5,309,778 A | 5/1994 | Antonov | |
| 5,327,987 A * | 7/1994 | Abdelmalek | 180/65.2 |
| 5,353,578 A | 10/1994 | Irby et al. | |
| 5,403,244 A * | 4/1995 | Tankersley et al. | 477/20 |
| 5,425,684 A | 6/1995 | Dougherty | |
| 5,582,556 A | 12/1996 | Phung | |
| 5,686,818 A | 11/1997 | Scaduto | |
| 5,762,161 A * | 6/1998 | Caires et al. | 180/165 |
| 5,845,731 A * | 12/1998 | Buglione et al. | 180/65.2 |
| 5,917,304 A * | 6/1999 | Bird | 320/101 |
| 6,034,492 A | 3/2000 | Saito et al. | |
| 6,118,194 A | 9/2000 | Kawamura | |
| 6,138,781 A * | 10/2000 | Hakala | 180/2.2 |
| 6,267,190 B1 | 7/2001 | Micheletti | |
| 6,331,365 B1 | 12/2001 | King | |
| 6,332,504 B1 | 12/2001 | Adds | |
| 6,340,339 B1 | 1/2002 | Tabata et al. | |
| 6,358,172 B1 | 3/2002 | Hiegemann | |
| 6,435,584 B1 * | 8/2002 | Bonnville | 296/35.1 |
| 6,502,652 B2 * | 1/2003 | Rogg | 180/65.2 |
| 6,554,088 B2 * | 4/2003 | Severinsky et al. | 180/65.2 |

* cited by examiner

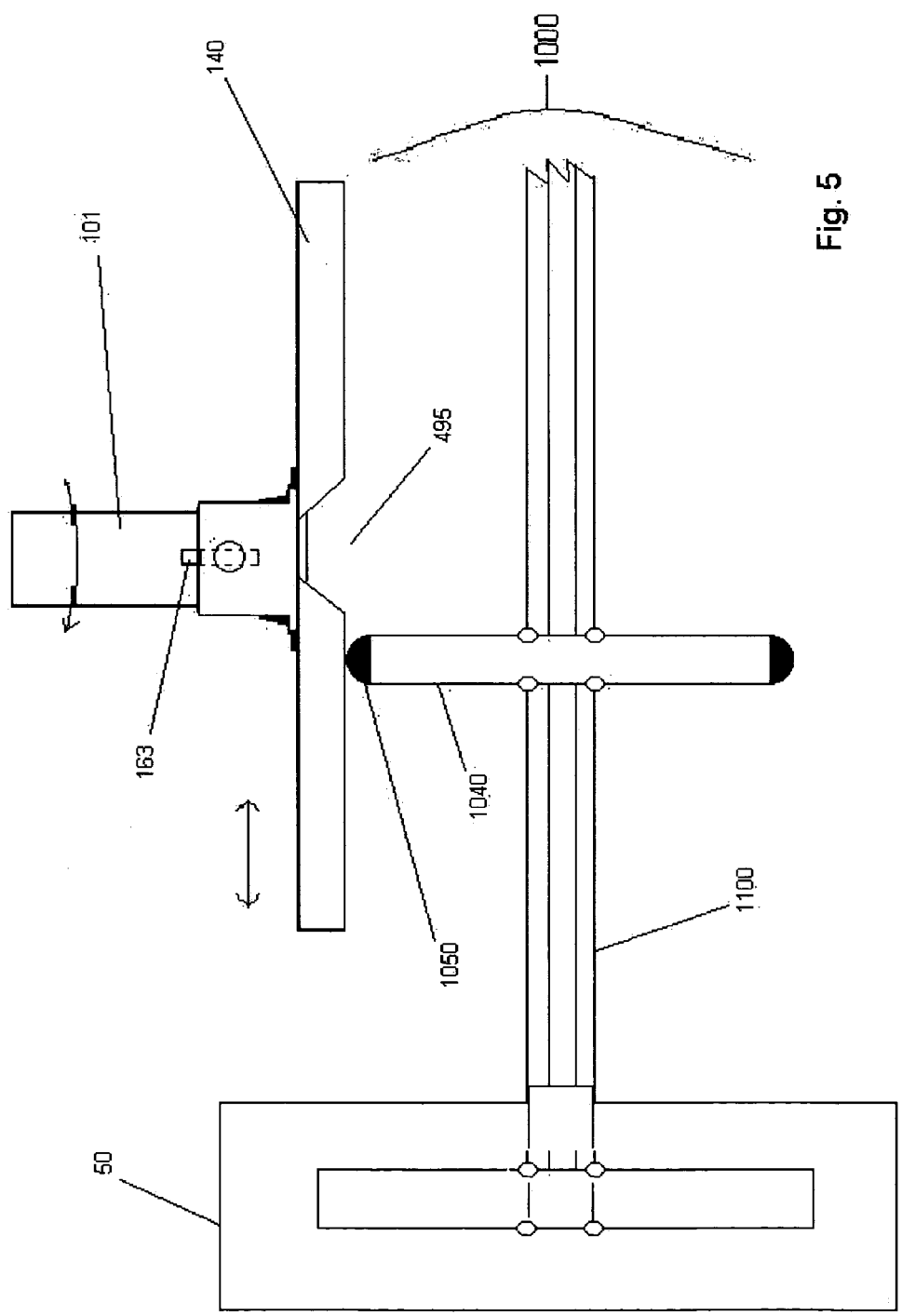

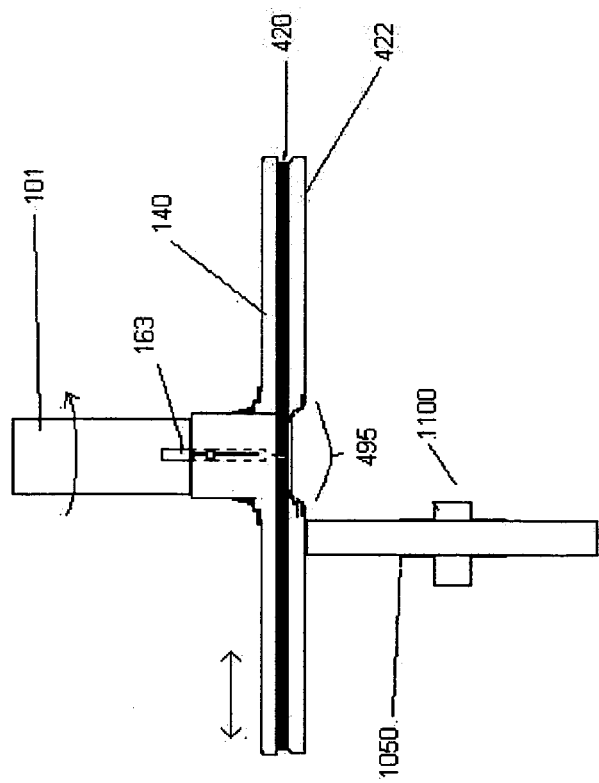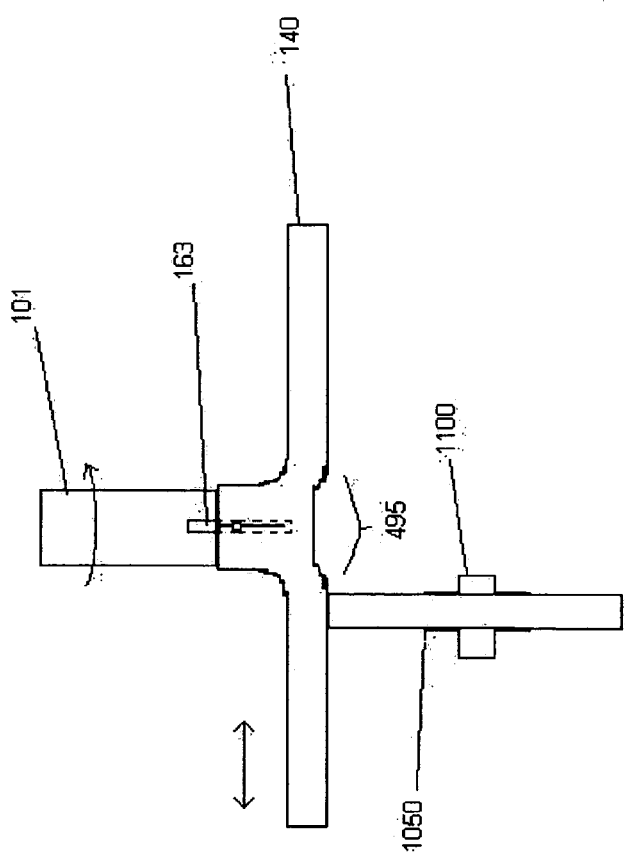

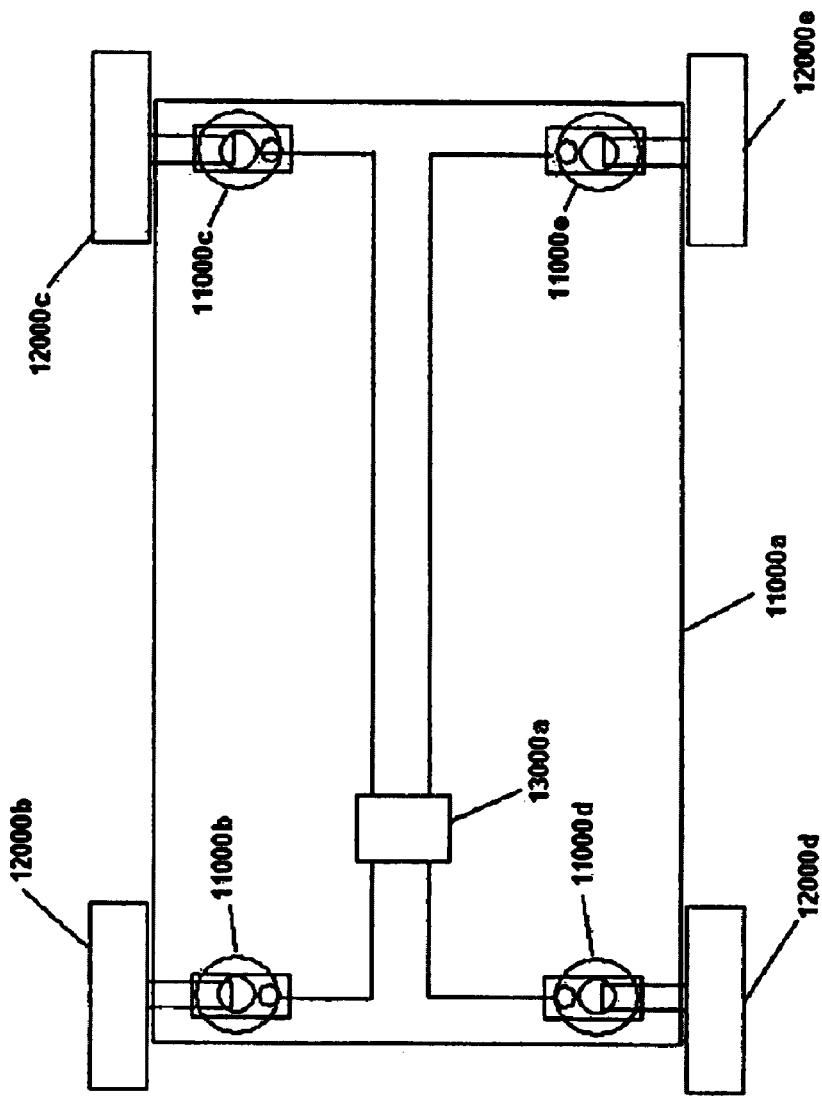

VEHICLE DRIVE SYSTEM WITH ENERGY RECOVERY SYSTEM AND VEHICLE MOUNTING SAME

CROSS REFERENCE TO RELATED APPLICATIONS

This application claims benefit of the earlier filed U.S. Provisional Application No. 60/370,985 filed Apr. 10, 2002, which is incorporated herein by reference.

FIELD OF THE INVENTION

The invention is directed to a drive system for returning power to at least one power storage device and to a vehicle mounting the vehicle drive system and a drive system for returning power to at least one power storage device with an intermittently engageable power recovery device. The invention is especially directed to a drive system coupled to an electric motor and having a flywheel, where the primary driving element of the drive train is directly coupled to the flywheel and, especially, a golf cart having the drive system.

BACKGROUND OF THE INVENTION

Throughout the history of the vehicular transportation three principle types of power have been used in conventional vehicles—namely, petroleum (gasoline and diesel) or internal combustion, steam and electric. Further developments in new solid fuel technologies, including hydrogen and alcohol cell devices, and atomic powered vehicles have been attempted. However, the primary drive system for most vehicles has been the internal combustion engine using petroleum fuels.

While the gasoline engine has been the primary power source for vehicles for many years, the energy problems being encountered throughout the world and the environmental impact of emissions from petroleum based fuels have caused an increased interest in various alternative energy sources. Governmental initiatives and commercial demand have, in recent years, increased development efforts of electric energy, zero emission motors as a prime mover for vehicles. Several of these efforts have been based on special applications in the golf course, security, commercial manufacturing, and mass transportation industries where several zero emission vehicles are designed and manufactured for minimal impact on indoor and outdoor environments or for added stealth over conventional gasoline engine vehicles. Additionally, several metropolitan mass transportation systems have utilized electrically powered vehicles in an experimental capacity and automakers continue to pursue both electric and hybrid electric passenger vehicle designs.

Such developments have produced stronger, longer ranged, more efficient, lighter weight vehicles using new materials and improved, long-life, rechargeable batteries substantially extending vehicle operating ranges. These objectives are recognized as essential goals to improve upon in order to achieve wider consumer acceptance of electric powered vehicles. However, one of the, if not the most, important principal aspects to improving the viability of electric powered vehicles is increasing the range of the vehicle or reducing the number of power cells required for operation or both. This would make the vehicle more cost effective to produce and operate as both a passenger vehicle and as a specialty vehicle in specialized roles like surveillance or zero emission mass transportation.

Prior attempts at providing vehicles, especially electrically powered vehicles, with these beneficial characteristics have been made. Several of these efforts have been directed to provide energy recovery systems to golf carts or small vehicles that utilize energy recovery devices. Still further attempts have been directed to utilizing flywheels to store energy from movement in a vehicle or a motor. However, none of these efforts have had any commercial success.

One example of an attempt to provide an energy recovery drive in a golf cart is the device seen in U.S. Pat. No. 3,530,356 to Aronson. The patent discloses a multiple position setting for control of a golf cart. The vehicle engages an alternator and returns energy to a battery bank when a specific pedal condition occurs. The alternator can only be engaged when the vehicle reaches speed and the pedal control is released. The drive mechanism cannot return energy when the vehicle is stationary, nor can it recover energy while accelerating. It runs the alternator only when decelerating and then only from the drive train. Additionally, it does not even suggest the use of a flywheel to recover energy. It simply runs an alternator intermittently from the drive train after a particular control input is released. It is ineffective at returning energy to the batter bank.

U.S. Pat. No. 4,477,764 to Pollard shows an electric vehicle adapted to generate and recharge its principal energy storage devices. The electric motor is driven by depressing an accelerator switch. A speed switch and a gravity switch are also provided, so that during periods of high speed or increased speed going downhill, a generator is engaged to recover energy from the excess speed. Additionally, an "accessories" battery is also charged by an alternator when the drive train is in motion. Again, the principal alternator is only operating when the vehicle is in motion. This requires the vehicle to use additional energy from its batteries to achieve locomotion and, then and only then, can it begin to recover a scintilla of spent energy. This is a significant problem in various vehicular applications. For instance, in the golf industry, the consistent stopping and starting of the vehicle renders this improvement useless as the vehicle never achieves sufficient forward motivation to engage its energy recovery mechanism. Moreover, the device does not return energy when the vehicle is stopped, either before or after it has reached speed. Nor does it utilize a flywheel or infinitely variable transmission unit, such as a traction drive unit.

U.S. Pat. No. 5,686,818 to Scaduto is another attempt directed to a vehicle with a recuperative drive having generators mounted on the axle and a switching mechanism to engage the generators after vehicular motion has begun. The rear wheels are on a shaft and drive a set of alternator/generator combinations. The vehicle begins operation by draining power from the batteries to achieve motion and, at a specified operating condition, the switch activates the alternation/generation of electrical energy, which is returned to the power storage device. Again, the recuperative mechanism of the vehicle relies on utilizing energy to achieve speed and then and only then does it begin returning some of the spent energy. Further, the device does not use a weighted drive member or a traction drive unit. Again, this solution is not suitable for a vehicular application and has not achieved any marked commercial success.

U.S. Pat. No. 4,095,665 to Armfield describes an electric car. The car has a standard gearbox connected through a first clutch to a motor and through a second clutch to a generator. This allows the car to disengage its drive system from the motor and engage the generator by activating and deactivating the clutches. Although the generator can be driven by the drive train, it can only be done while the gearbox is moving. Thus the vehicle cannot recover energy when the vehicle is or becomes stationary. Moreover, the vehicle does not utilize a weighted drive member in its transmission, relying instead on a commonly geared transmission. Nor does it suggest the use of a traction drive unit. The gearbox and generator combination depicted is an inefficient way of trying to recover the kinetic energy of the vehicle given typical acceleration and deceleration patterns in vehicles.

Additionally, several patents have been directed to implementing flywheel devices in vehicle and vehicle drive trains in an attempt to store energy. However, none have been commercially successful and none contemplate using the flywheel as the primary transmission. Further, none of the prior patents have used an energy recovery device in conjunction with the flywheel, but instead typically use the flywheel as the power storage device. Moreover, none have incorporated the flywheel as the principal drive means, instead in keeping with the flywheel as an energy storage device, they shunt power through the flywheel by disconnecting the normal power transmission path.

For instance, U.S. Pat. No. 1,335,249 to Leymarie; U.S. Pat. No. 2,803,151 to Clerk; U.S. Pat. No 2,935,899 to Nallinger; U.S. Pat. No 3,396,607 to Ross; U.S. Pat. No 3,665,788 to Nyman; U.S. Pat. No 3,749,194 to Bardwick, III; U.S. Pat. No 3,672,244 to Nasvytis; U.S. Pat. No 3,771,311 to Herbst; U.S. Pat. No. 4,233,858 to Rowlett; U.S. Pat. No. 4,343,371 to Smitley; and U.S. Pat. No 4,779,485 to Dollison et al. disclose drive units that rotate a flywheel for conservation of energy. However, in these examples and in others like them, the unit charges the flywheel using a pinion gear or similar gear and then utilizes the spinning flywheel to drive the vehicle through a separate transaxle or similar system in conjunction with the primary motor or instead of the primary motor. These designs do not impart energy back to an energy storage device or utilize the flywheel in an efficient manner as part of there transmission, but instead attach it as a power storage device to be utilized for motivation of the vehicle with or in the absence of power from the prime mover. The result is a very inefficient system.

Further examples include U.S. Pat. No. 4,031,421 to Carini, showing a flywheel transmission using geared pinions and driven by multiple electric motors. Again, the pancake drive system shown takes power from a prime mover, in this case the electric motors, to begin turning. The prime movers charge both flywheels. These in turn impart energy to a driven wheel mounted on an axle. This drive unit is more efficient than the pinion gears discussed above. However, no mention of energy recovery from the flywheels is made and the operation of the prime movers is utilized only to motivate the flywheels and then keep them at a specified RPM range. Moreover, no mention is made of recovering energy from the system.

U.S. Pat. No. 4,131,171 to Keyes discloses a low energy consumption vehicle propelled by a thermal engine and using a flywheel. The flywheel is coupled to an infinitely variable ratio transmission. The system is designed to balance energy in a vehicle with a low power thermal engine that is run at a constant energy output. The engine charges the flywheel when the system is not at "peak" power requirements, for instance during idling and coasting periods. Thus this patent is directed to a further modification of the energy storage type designs discussed above. It does not recover energy during deceleration nor does it provide for energy recovery when the motor is de-energized. Instead it simply shifts the energy to a flywheel for storage In U.S. Pat. No. 4,329,889 to Hachiya provides for a power transmission system for use with and internal combustion engine. The system spins a flywheel and a series of pinioned gears connected to rotational discs that are attached to magnetic clutches. Each of these discs is engaged by the electromagnetic clutch as part of the transmission of the vehicle. These in turn drive a set of gears. The system uses the gearing and disc setup to charge the flywheel when the engine idles and then employs the energy to propel the vehicle. Again, similar to the other patents described above, the flywheel is being used to store energy, not return energy or recover energy from the transmission. The limited recovery of energy from the idling of the engine compared to the added weight of the disks and clutches makes this very inefficient and impractical for use in any vehicle.

In addition, a variety of vehicles have used traction drives, but they have not used the traction drive in conjunction with a flywheel and an energy recovery device to return energy. For instance, U.S. Pat. No. 5,425,684 to Dourgherty; U.S. Pat. No 5,353,578 to Irby et. al.; U.S. Pat. No 4,498,553 to Rouse; U.S. Pat. No. 3,667,304 to Puffer et al.; U.S. Pat. No 3,631,730 to Hadler et al.; U.S. Pat. No 3,613,814 to Prier Jr.; U.S. Pat. No 3,445,991 to Hansen et al.; and U.S. Pat. No 3,327,546 to Gordon et al. all describe various traction drive transmissions for lawn mowers and small vehicles.

The '552 patent to Rouse is an example of the typical use of these drive units. The '552 patent shows a traction drive unit for an internal combustion engine (ICE) on a lawn mower having a driven disc and a traction disc that are intermittently engaged to propel the vehicle. The driven disc, coupled to the motor, is stationary and the traction disc is slid across the driven disc. However, there is no mention of energy or momentum energy recovery. Moreover, the driven disc is not a weighted disc but is only intended to spin to provide contact with the traction disc. There is no mention or consideration in any of this line of patents even entertaining the idea of adding or weighting the elements of the traction drives to spin for prolonged periods of time after the power to the engine is shut off. Nor is there any mention of the use of an energy recovery devices in conjunction with the traction drive units to return energy back to an power storage device, especially an electric power storage device.

Traction drives are also used in other technology areas. For instance, in U.S. Pat. No. 3,022,383 to Springer, a rotatable electromagnetic transducer system for tape drives is shown. Although the transmission of motive forces is through friction plates contacting friction rollers, the invention is directed to solve tape synching problems. However, the system is used to maintain speeds in the playback heads of a recording device. In this instance, the friction plates are not wound at sufficiently high enough revolutions per minute (RPM) to even consider driving a vehicle, much less recovering energy from the drive system.

Additionally, alternators are used in standard automobile starter systems and electrical systems. These systems are used with ICE systems and require "cranking" a starter motor to initiate the ICE system and start the return of energy to battery through the alternator. Although the auxiliary electrical system, typically a 12-Volt battery, remains charged from the alternator, it is used only for starting the vehicle. There is no recuperation of energy from a flywheel for storage, nor is there any suggestion to modify these systems to do so.

To date, no device has achieved a substantial return of energy to a storage device in for a sufficient duration of time, including while idling, to extend the operating range of a vehicle. Additionally, those proposals that have been attempted add unreasonable costs to the vehicle. Therefore, a continued need exists for an improved energy recovery system for use in vehicles, especially for use in vehicles employing electrical drive units, that is cost effective and operates to extend range and reduce weight. A need also still exists for a recuperative drive mechanism that drives a vehicle and can achieve a return of energy while moving, while coasting, and even while sitting still. The improved efficiency of such a device would allow for longer duration of operation in vehicles, especially electric vehicles. Similarly, in the case of electric vehicles, such a device would allow for additional electrical accessories heretofore unusable if such an electric vehicle while maintaining a reasonable duration of operation. Ultimately, such a device could be utilized in developing zero emission passenger vehicles and other commercial vehicles for everyday use for day to day driving.

SUMMARY OF THE INVENTION

An advantage of the instant invention includes greatly increasing the duration that a vehicle may operate on a set of power storage devices.

Another advantage of the instant invention is it can operate for the same or similar duration on fewer power storage devices, reducing the overall weight of the vehicle.

A still further advantage is a vehicle with an infinitely variable transmission that is cost effective to produce and has greater range than currently available alternative energy vehicles, is a zero emission vehicle, and can return energy to at least one power storage device.

Still another advantage of the instant invention is it can be used to power non-petroleum based vehicles more efficiently, thus lessening dependence on energy imports.

A further advantage is the wide diversity of applications to which it can be applied, including vehicles, power generation, power storage, and other uses.

A still further advantage can be extension of the life cycle of the power storage devices, especially electrical storage devices, and increased time between needed replacement of the power storage devices.

Another advantage is lower operation cost through return of energy while equipment mounting the invention is in use.

To achieve these advantages the invention includes an apparatus, a method for making an apparatus and a method for operating an apparatus. In the exemplary embodiment of the instant invention a motor draws energy from an at least one power source and charges an at least one weighted drive member or flywheel. In an exemplary embodiment the charged flywheel is coupled to an infinitely variable transmission and is a driving element in the transmission. The flywheel controls the speed of the vehicle through intermittent coupling with the transmission. The flywheel is engaged by at least one energy recovery device to return energy to the at least on power storage device. The energy recovery device can be in constant contact with the flywheel or it can be intermittently engaged to recover excess kinetic energy used to initiate the flywheel and the transmission. The flywheel can thus be disengaged from the drive unit to cease motion and its energy can be recovered regardless of whether the vehicle is in motion or is stationary.

The system of the instant invention further includes an at least one power storage device with a motor driving a driven shaft. An at least one energy recovery device can be coupled to said driven shaft such that said motor continually turns said driven shaft and operates said energy recovery device. The driven shaft can drive a selectively engageable drive mechanism.

The energy recovery drive system can further comprise a weighted drive member at a distal end of said driven shaft. The energy recovery drive system can also have the at least one energy recovery device engaging the driven shaft along the weighted drive member.

The invention also includes a vehicle with an energy recovery drive system having a vehicle frame with a drive support assembly coupled to and being movable relative to the frame. An at least one electric motor can be coupled to the drive support assembly and an at least one power storage device can be coupled to the frame and can be coupled to the motor. The driven shaft being driven by the motor. The vehicle can also include an at least one energy recovery device coupled to the driven shaft and turning at all times the driven shaft is turning. A drive unit can also be selectively driven by the at least one motor and, in turn, drive an at least one set of wheels.

The vehicle can further include a weighted driven wheel at a distal end of the driven shaft, where the drive unit is a traction wheel coupled to the driven shaft through the intermittent engagement with the weighted driven wheel such that said at least one set of wheels is, thereby, selectively engageable. The vehicle where the drive unit can be an infinitely variable transmission with at least one moving part coupled to and driving the at least one energy recovery device and simultaneously coupled to and driving said at least one set of wheels. The weighted drive member can be, for instance, an aluminum disc and can be coupled to the driven shaft so as to be raised and lowered with the support assembly.

The at least one energy recovery device can comprise a first energy recovery device. The vehicle having the first energy recovery device return at least 10% of the energy used by the at least one motor. The vehicle can also have the first energy recovery device return at least 30% of the energy used by the at least one motor. The vehicle can also have the first energy recovery device returns at least 60% of the energy used by said at least one motor.

The at least one energy recovery device can also further comprise a second energy recovery device. The second energy recovery device can be coupled to the at least one set of driven wheels. The second energy recovery device can also be coupled to the motor. The second energy recovery device can also be coupled to the driven shaft. The distance at which the drive member contacts the traction member along a first side from a center point of the drive member can be proportional to the speed of the vehicle. The drive member can also contact the traction member along a second side from a center point of the drive member such that the speed of the drive is proportional to the speed in reverse of the vehicle.

The at least one set of wheels can further comprise a first and second set of wheels with the first and second set of wheels being driven simultaneously by the at least one motor. The at least one energy recovery device can also be mounted to said vehicle frame to return energy from motion of the vehicle.

The invention also includes a further drive system comprising at least one power storage device, at least one motor intermittently energized and de-energized through coupling to the at least one power storage device, at least one weighted drive member coupled to the at least one motor and an at least one energy recovery device returning energy to the at least one power storage device when the motor is energized. A drive unit is coupled to the at least one weighted drive member such that the motor drives the at least one weighted drive member which in turn drives the drive train so that when the at least one weighted drive member is disengaged from the drive train, the motor remains in an energized state and the at least one energy recovery device continues to return energy to the power storage device so long as the weighted drive member is driven.

The at least one energy recovery device can be coupled to the weighted drive member. The drive system can further comprise a clutch device intermittently engaged to couple the weighted drive member and the drive train. The clutch mechanism can further comprises a torque plate having a depression section, wherein the traction member is disengaged when coupled within the depression section and engaged when coupled outside of the depression section. The drive system can further comprise a switch that controls the flow of power from the power storage device to a controller that is coupled to the motor, the controller energizing the motor in response to the condition of the switch.

The mass of the weighted drive member can be concentrated towards the outside of the shape of the weighted drive member. The at least one energy recovery device can be intermittently coupled to an energy recovery device through an intermittent engagement device. The weighted drive member can be one of a conical, radial, spheroid, toroid, or elliptical shape. The drive member can be constructed from metal, epoxies, ceramics, wood, or plastic. The at least one energy recovery device can be directly coupled to the weighted drive member.

The at least one energy recovery device can be directly coupled to the motor. The at least one energy recovery device can be a tractive member coupled to an energy recovery mechanism. The energy recovery mechanism can be one of a generator, an alternator, a permanent magnet device or a stator.

The drive system can further comprise a controller, where the at least one energy recovery device is intermittently engaged in response to a control input from said controller. The control input can be at least one of a foot pedal, a lever, a slideable switch, or a push button switch for example.

The drive member can be a weighted disk-shaped member. The weighted disk-shaped member can have a substantial amount of weight concentrated towards an outer diameter of the member.

The at least on energy recovery device can further comprise a first energy recovery device. The weighted drive member can be intermittently coupled to the first energy recovery device through an intermittent engagement device, so that when said weighted drive member is driven said first energy recovery device is engaged.

The first energy recovery device can be a tractive member coupled to an energy recovery mechanism. The energy recovery mechanism can be a generator, alternator, a permanent magnet device, or stator. The drive system can further comprise a controller, where the intermittent engagement device is coupled to the controller. The controller can selectively engage the energy recovery device with the weighted drive member in response to a change in a control input. The intermittent engagement device can be one of a spring with tension arm and micro controller, a switch with a motor and a screw, or a clutch mechanism. The drive unit can be one of a traction drive unit, a hydrostatic drive unit, or an infinitely variable gear ratio drive unit.

The at least one energy recovery device can further comprise an additional energy recovery device returning power to the at least one energy storage device while the weighted drive member is moving. The at least one energy recovery device can further comprise three or more energy recovery devices.

The at least one energy recovery device can further comprise a drive unit energy recovery device for recovering energy from the drive unit when the drive system is moving. The at least one power storage device can comprise a plurality of batteries storing electrical energy.

The instant invention includes a still further drive system comprising at least one power storage device with at least one motor intermittently energized and de-energized through coupling to the at least one power storage device, an at least one weighted drive member coupled to the motor, the at least one energy recovery device returning energy to the at least one power storage device when the motor is de-energized and the weighted drive member is moving. With a drive unit coupled to said at least one weighted drive member such that the motor drives the at least one weighted drive member which in turn drives the drive unit and when the drive unit is disengaged from the drive unit, the motor remains in an energized state and is disengaged from contact with the weighted drive member.

The at least one energy recovery device can be intermittently applied to the weighted drive member upon de-energization of the motor. The drive system can be used in a vehicle and the drive system can continue to return energy to the at least one power storage device even after the vehicle is stopped. The at least one energy recovery device can be simultaneously engaged with said motor and continue to operate after the motor is de-energized, recovering the kinetic energy remaining in the system. The energy recovery device can also operate after the drive unit has stopped being driven.

The at least one energy recovery device can be coupled to the weighted drive member. The drive system can further comprise a control input that controls the flow of power from the at least one power storage device to a controller that is coupled to the motor, the controller energizing the motor in response to the control input. The mass of the weighted drive member can be concentrated towards a periphery of the shape of the weighted drive member.

The at least one energy recovery device can be intermittently coupled to the weighted drive member through an intermittent engagement device. The at least one energy recovery device can also directly coupled to the weighted drive member. The at least one energy recovery device can also be directly coupled to the motor.

The at least one energy recovery device can be a tractive member coupled to an energy recovery mechanism. The energy recovery mechanism can be a generator, a permanent magnet device, a stator or an alternator. The controller can intermittently engage the at least one energy recovery device in response to a control input. The control input could be one of a foot pedal, a lever, a slideable switch, or a push button switches.

The drive member can be a weighted disk-shaped member. The weighted disk-shaped member can have a substantial amount mass concentrated along an outer diameter of the member. The at least one energy recovery device can further comprise a first energy recovery device. The weighted drive member can be intermittently coupled to the first energy recovery device through an intermittent engagement device. The first energy recovery device can be a tractive member coupled to an energy recovery mechanism. The energy recovery mechanism can be one of a generator, an alternator, a permanent magnet device or a stator.

The drive system can further comprise a controller, where the intermittent engagement device can be coupled to the controller. The controller can selectively engage the at least one energy recovery device in response to a control input. The intermittent engagement device can be one of a spring with tension arm and micro controller, a switch with a motor and a screw or a clutch mechanism.

The drive unit can be one of a traction drive train, a hydrostatic drive train, or an infinitely variable gear ratio transmission. The at least one energy recovery device can further comprise a second energy recovery device. The at least one energy recovery device can further comprise three or more energy recovery devices. The at least one energy recovery device can further comprises a third energy recovery device for recovering energy from the drive unit when the drive unit is moving. The at least one energy recovery device can also further comprise a third energy recovery device for recovering energy from an at least one set of wheels driven by the drive unit.

The instant invention includes yet another drive system having a drive support carriage providing support for an at least one power source with an at least one weighted drive member that is intermittently engaged with a transmission unit. The system having an at least one energy recovery device coupled to the motor and driven simultaneously with the weighted drive member.

The drive system can further comprise an at least one power storage device, the power source coupled to the at least one power storage device and a switch coupled to the at least one power storage device and to a controller, the switch energizing or de-energizing the at least one power source through the controller. The at least one power storage device can be a battery bank. The at least one power source can be one of an electric, a hydraulic, or internal combustion motor. The power source can also be a DC electric motor.

The drive system can further comprise a driven shaft extending from the power source having a gear box and a belt pulley coupled to the driven shaft and the at least one energy recovery device. The energy recovery device can be an alternator. The at least one energy recovery device can be coupled to the at least one power storage device to return energy to the at least one power storage device.

The at least one energy recovery device can be coupled to an at least one electrical accessory. The at least one electrical accessory can be at least one of a GPS system, a sound system, and an air conditioning system. The motor can provide the at least one drive member with momentum and the at least one energy recovery device can be driven by the momentum of the weighted drive member.

The weighted drive member can be a disc shaped member. The drive member can also be one of a conical, radial, spheroid, toroid, or elliptical shaped weighted drive member. The disc shaped weighted member can have a concentration of mass on an outer circumference of the member.

The drive system can further comprise a drive assembly, the drive assembly having the motor, a gearbox coupled to the motor, and a motor support plate. The at least one energy recovery device can comprise a first energy recovery device coupled via a pulley to the gearbox.

The energy recovery device can further comprise at least one of additional belt pulleys, gearing, electrical circuitry, electrical components or sensors. The drive system can also further comprise sensors and electrical devices and a controller, wherein the sensors and electrical devices communicate the condition of the at least one of the at least one power storage device, the drive assembly, or the transmission unit to the controller.

The weighted drive member can be moved vertically to engage a traction member. The traction member can be coupled to the transmission unit. The weighted drive member and a traction member can be moved relative to one another to engage and disengage the transmission unit.

The weighted drive member and the traction member can be moved horizontally relative to one another to adjust the speed at which the transmission unit is driven.

The drive system can further comprise a vacuum housing encasing the weighted drive member, the at least one energy recovery device, and the traction member.

The drive system can also further comprise a drive support carriage having a frame, a set of rails, and at least one set of bearings. The drive system can further comprise a drive assembly having the weighted drive member, the motor, a motor support plate, and the at least one energy recovery device, the drive assembly being coupled to the motor support carriage. The drive assembly can transition freely in both vertical and horizontal directions relative to the transmission unit. The drive system can further comprise at least one biasing element that can raise the drive assembly and the support carriage and keep the transmission unit disengaged from the weighted drive member.

The drive system can further comprise the vertical adjustment mechanism which lowers the drive assembly and the motor support carriage against the at least one biasing element. The drive system can further comprise a horizontal adjustment mechanism for movement of the drive assembly in the horizontal direction relative to the transmission unit. The vertical adjustment mechanism can be at least one of a motor and a camshaft, a spring member, a screw gear, a worm gear, a ratcheting gear, or a hydraulic piston.

The drive system can further comprise a controller for controlling a horizontal transitioning of the transmission unit relative to the drive assembly. The drive system can further comprise a controller for controlling the horizontal transitioning of the drive assembly relative to the transmission unit. The drive assembly can move on the support rails supported by the support members of the motor support carriage. The position of the weighted drive member relative to the transmission unit can adjust the speed at which the drive system is driven.

The drive system can include a controller that can be connected to a control input. The controller can be one of an electric control system, a hydraulic control system, a computer control system or a combination therein. The controller can in response to the control input activate a transitioning motor, which in turn moves the motor assembly in relation to the transmission unit. The support members can be a set of over-under rollers traveling along rails with a screw drive. The support members can also be a set of linear bearings and a worm gear connected to a motor. The controller can be utilized to control the position of the drive assembly and the motor support carriage in both horizontal and vertical directions.

The drive system can further comprise additional energy return devices that are coupled to the motor. The drive can further comprise additional energy return devices that are coupled to the motor shaft. The drive system can further comprise additional energy return devices coupled directly to the weighted drive member. The drive system can further comprise additional energy return devices coupled indirectly to the weighted drive member.

The at least one energy recovery device can be a first energy recovery device and a second energy recovery device. The first and second energy recovery devices can simultaneously contact the weighted drive member with a tractive wheel that turns a second energy device. The second energy recovery device can intermittently contact the weighted drive wheel. The at least one energy recovery device can also be part of the motor.

The method of the instant invention includes a method of driving a transmission unit comprising the steps of providing energy to a power source from an at least one power storage device, energizing a weighted drive member with said motor, energizing an energy recovery device with said weighted drive member, engaging a control input to activate a controller and driving the transmission with said weighted drive member in response to the activation of the controller, wherein the weighted drive member returns energy to the at least one power storage device while the weighted drive member is energized.

The transmission being driven can be a part of a vehicle, for example a golf cart, an electric community vehicle, a boat, an aircraft, a helicopter, or a wheelchair. The method of driving a transmission can further comprise the step of engaging an additional control input to cease the energizing the weighted drive member. The method of driving a transmission can also further comprise the step of releasing the control input and sensing the release of the control input with the controller to cease the energizing of the weighted drive member. The method of driving a transmission of claim can further comprise the step of returning the weighted drive wheel to a disengaged state and allowing it to continue to be energized by the motor without driving the transmission. The method of driving a transmission can further comprise the step of simultaneously returning energy from the weighted drive wheel while in the disengaged state.

The instant invention further includes a drive system comprising at least one power storage device with a motor support carriage with a motor assembly, the motor assembly including at least one motor coupled to the at least one power storage device, wherein the motor is initially de-energized and the motor becomes energized when coupled to the power storage device. The system has a weighted drive member driven by the motor and intermittently engaging a transmission unit and at least one energy return device coupled to the at least one power storage device and intermittently engaged when the motor is de-energized.

The drive system can further comprise a switch coupled between the at least one power storage device and the motor, wherein the switch de-energizes and energizes the motor. The switch can be coupled to a control input. The control input can be coupled to a controller that is coupled to the motor and the controller activates the motor in response to input from the control input. The motor is energized by the controller in response to the engaging of the control input.

The drive system can further comprise a clutch device between the weighted drive member and the transmission unit. The clutch device can further comprise a clutch member that rests between the weighted drive member and a torque plate. The torque plate is intermittently engaged with the transmission unit. The drive system of can further comprise a controller and a control input, where signals from the control input activate the controller, which engages and disengages the clutch device. The drive system can further comprise a controller and a control input and an additional control input, wherein signals from the control input activate the clutch device and signals from the additional control input disengages the clutch device. The clutch device can be one of a mechanical, a hydrostatic, or an electrical.

The controller can provide a delay to allow the motor to spin up the weighted drive member to a specified rotational speed before engaging the traction member. The motor can be one of an electric, a hydraulic, or an internal combustion motor. The motor can be a DC electric motor. The motor can be an internal combustion engine.

The drive system can further comprise a motor support carriage comprising a frame, at least one set of support rails and at least one set of support members. The drive system can further comprise a drive assembly comprising the weighted drive member, the motor, a motor support plate, and the at least one energy recovery device, the drive assembly being coupled to the motor support carriage. The drive assembly can be supported on the least one set of support rails with the at least one set of support members. The drive assembly can transition freely in the horizontal direction relative to the transmission unit to control the speed of the vehicle. The drive system can further comprise a transitioning motor coupled to the drive assembly to transition the assembly. The horizontal motion and placement of the drive assembly relative to the transmission unit can determine the speed of the drive system and can be controlled by a controller coupled to a control input. The at least one energy recovery device can comprise a first energy recovery device mounted on a motor support plate within the motor assembly. The first energy recovery device can remain in contact with the weighted drive wheel at a set distance from a center-point of the weighted drive member.

The drive system can further comprise a second energy recovery device. The second energy recovery device can be driven directly from the motor. The second energy recovery device can be driven by a gearbox that is driven directly from the motor. The second energy recovery device can also be engaged while the motor is energized. The first energy recovery device can be mounted on the motor support carriage. The first energy recovery device can include a tractive wheel that moves over the top of the weighted drive wheel as the wheel returns to its starting position.

Multiple energy recovery devices can be operated simultaneously with the motor. The first energy recovery device can be attached to the support carriage at a fixed distance relative to the center point of the weighted drive member. The first energy recovery device can be free to move horizontally relative to the weighted drive member. The first energy recovery device can engage a shaft extending from the motor.

The instant invention also includes a further method of driving a transmission comprising the method steps of providing energy to a power source from at least one power storage device, engaging a control input to activate a controller, energizing a weighted drive member with said motor, engaging and driving the transmission with said weighted drive member in response to the activation of the controller, disengaging the driving of the transmission in response to a signal from the controller, energizing an energy recovery device with said weighted drive member and returning energy to the at least one power storage device while the weighted drive member is disengaged from the transmission and slowed.

The steps of driving and disengaging the driving of the transmission can further comprise activating the controller and activating or deactivating a clutch mechanism. The step of activation of the controller can further comprise activation or deactivation of a control input. The step of activation of the controller can further comprises activation of a control input to activate the clutch and the activation of an additional control input to disengage the clutch. The step of engaging the transmission can further comprise the step of moving a drive assembly horizontally in response to signals from the controller and then engaging a clutch mechanism in response to signals from the controller to drive the transmission.

Moreover, the above brief description, objects and advantages of the instant invention are illustrative, and not exhaustive, of those that can be achieved by the invention. Thus, these and other objects and advantages of the invention will be apparent from the description herein, both as embodied herein and as modified in view of any variations which will be apparent to those skilled in the art.

BRIEF DESCRIPTION OF THE DRAWINGS

Exemplary embodiments of the invention are explained in greater detail by way of the accompanying drawings, where the same reference numerals refer to the same features.

FIG. 5 shows a close up view of the coupling of the drive unit and the weighted drive member of the exemplary embodiments of the instant invention.

FIGS. 9 and 10 show close up views of modified weighted drive members having depressions.

FIG. 12 shows a vehicle mounting exemplary embodiments of the instant invention.

DETAILED DESCRIPTION OF THE DRAWINGS AND EXEMPLARY EMBODIMENTS

Non-limiting exemplary embodiments of the invention are shown in FIGS. 1-11.

Figure 1:
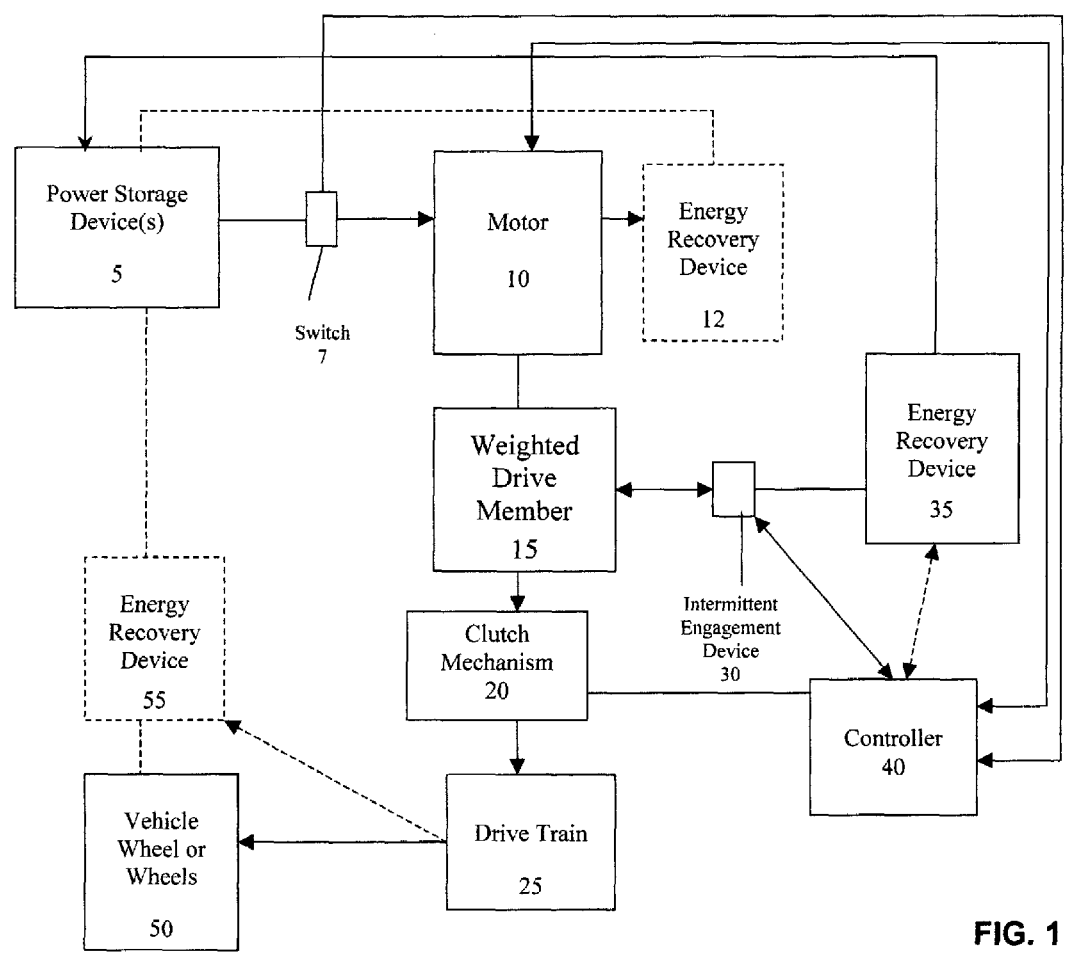
FIG. 1 shows a schematic of the instant invention.

FIG. 1 shows a schematic of the instant invention. At least one power storage device 5 is coupled to a switch 7 that controls the flow of power from the at least one power storage device 5 to a controller 40. The switch can, for instance, be a simple blade switch, a rheostat, a toggle switch or similar device. After turning the switch 7 to the "on" position, the controller 40 energizes the motor 10. The motor 10 can be simply turned "on" in one exemplary embodiment or it can be intermittently engaged in response to a control input in a further exemplary embodiment, as depicted below in relation to FIGS. 2, 4A-4B, 6 and 8A-8C.

The motor 10 in turn drives a weighted drive member 15, for example a disk-shaped member in which the mass of the member is concentrated towards the outer diameter of the member. The weighted drive member 15 is intermittently coupled to drive train 25 of the instant invention through clutch member 20. The weighted drive member 15 is also intermittently coupled to an energy recovery device 35 through an intermittent engagement device 30. The energy recovery device 35 can for instance be a tractive member or drive unit coupled to an energy recovery device 120, generator, stator or similar device. The intermittent engagement device 30 is coupled to the controller 40 and can be used to selectively engage the energy recovery device 35 in response to a change of conditions or control input. The intermittent engagement device 30 can be, for instance, be a spring with tension arm and a micro controller, a switch with a motor and a screw, a clutch mechanism, or similar device to provide for intermittent contact between the weighted drive member 15 and the energy recovery device 35.

When the system of the instant invention is engaged, the motor 10 drives the weighted drive member 15 which in turn drives a drive train 25 so that wheels 50 are energized. The drive train 25 can be for instance a traction drive train, a hydrostatic drive train, an infinitely variable transmission drive train, or similar drive train. When the drive train 25 is disengaged the motor 10 remains in either an energized or de-energized state and clutch member 20 disengages the drive train 25 from contact with the weighted drive member 15. The energy recovery device 35 can be applied to the weighted drive member 15 when the motor 10 is energized or it can be applied to the weighted drive member 15, if it has not been engaged previously, when the motor 10 is de-energized to recover the kinetic energy remaining in the drive.

Additional embodiments of the invention can utilize an additional energy recovery device 12, shown in dashed lines, to put energy back into the at least one power storage device 5 while the motor 10 is energized and driving the drive train 25. Still further embodiments can utilize a still additional energy recovery device 55 for recovering energy from the drive train 25 or the wheels 50 when the motor 10 is energized or de-energized.

Figure 2:
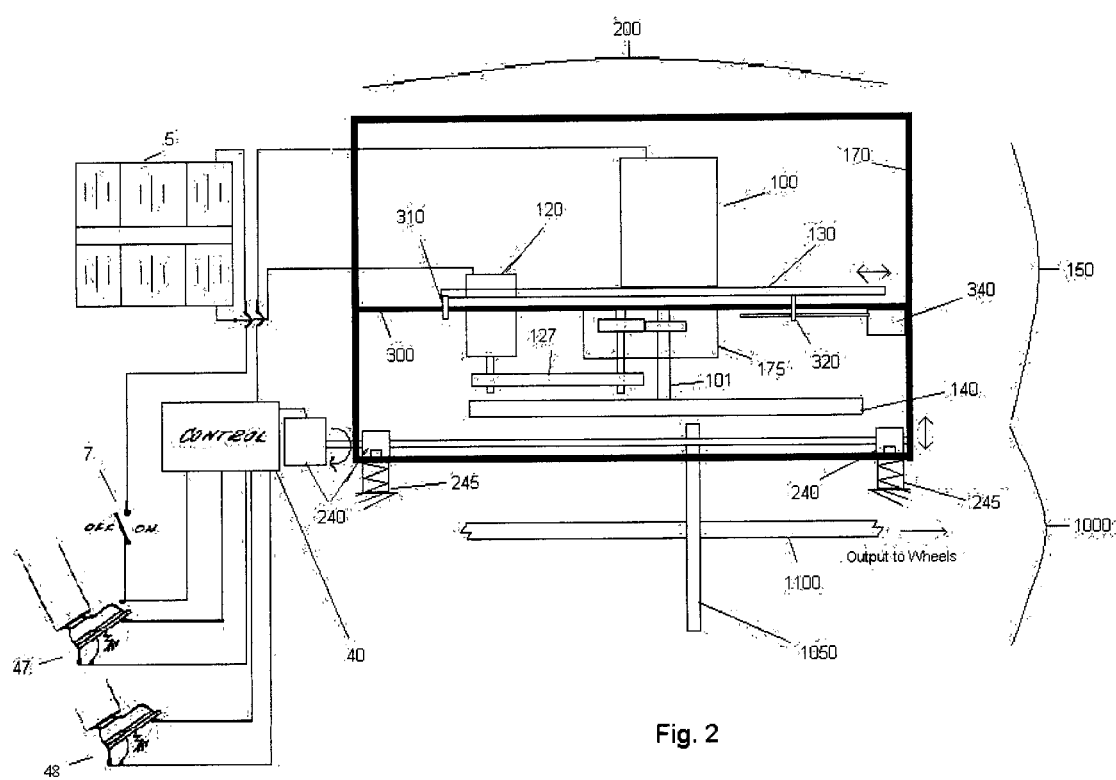
FIG. 2 shows a side view of an exemplary embodiment of the instant invention.
Figure 3:
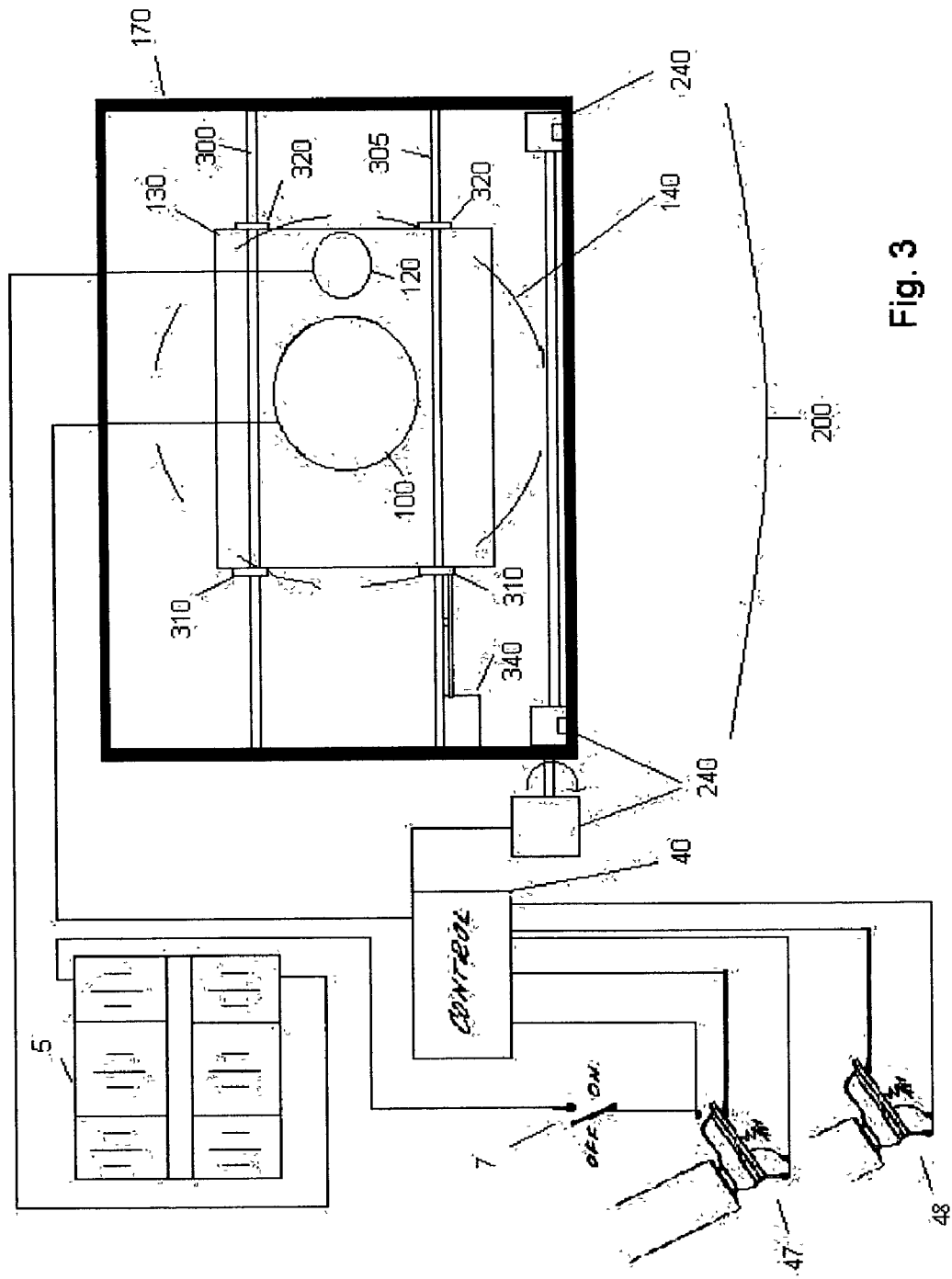
FIG. 3 shows a top view of the exemplary embodiment of FIG. 2.

FIGS. 2 and 3 show a side view and a top view, respectively, of an exemplary embodiment of the instant invention. The system comprises an at least one energy or power storage device 5, which can be for example a battery bank as depicted. The at least one energy storage or power storage device 5 is connected to a switch 7 which connects to controller 40 and motor 100. A drive support carriage 200 provides support for a power source or motor 100 and a weighted drive member or flywheel 140 that is intermittently engaged with a drive unit or transmission unit 1000. The at least one power storage device 5 is shown coupled to the power source or motor 100, the motor may for example be an electric, hydraulic, or internal combustion motor. In the first exemplary embodiment, shown in FIGS. 1-5, a conventional DC electric motor is depicted. At the same time, in this first embodiment, a first energy recovery device 120, an alternator for instance, is coupled to the motor 100 from driven shaft 101 with a belt pulley 127 and driven simultaneously with the weighted drive member 140. As seen in FIGS. 2 and 3, the first energy recovery device 120 is coupled to the at least one power storage device 5 and returns energy thereto. The first energy device 120 can return, for example, more than 10% of the energy used by the motor. Still further embodiments can return greater amounts of energy. Alternatively, the energy recovered can be directed to drive an electrical device or devices, such as GPS systems, sound systems, air conditioning systems, or the like, without the need for engaging the drive of the vehicle.

In the both the first and second exemplary embodiments, the weighted drive member 140 is shown as a disc shaped member. Additional embodiments may utilize different shapes, including but not limited to conical, radial, spheroid, toroid, elliptical or other shaped members to provide momentum in the drive system. In the exemplary disk shaped embodiment of the weighted member 140, the concentration of the weight of the disc shaped member on the outer circumference of the member helps to provide increased momentum and additional energy return. The motor 100 propels the weighted drive member 140, which extends from the drive assembly 150.

In the exemplary embodiment the drive assembly 150 includes the motor 100, a gear box 175, the gearbox 175 is coupled to the motor 100 through a driven shaft 101 driven by the motor, and the first energy recovery device 120 coupled to the gearbox 125 by pulley means 127 and all of this is coupled to a motor support plate 130. Alternatively, the drive assembly 150 may include additional devices to increase the system efficiency. These can include belt pulleys, gearing, and the like; electrical circuitry and components, both digital and analog, and sensors. These can especially include sensors and electrical devices for communicating the condition of the at least one power storage device 5, the drive assembly 150, and the transmission unit 1000 to the controller 40. The additional devices can be mounted on a drive support carriage 200 or on the support plate 130.

As best seen in FIG. 3, the drive assembly 150 is mounted on rails 300, 305 with sets of bearings 310,320. The rails 300, 305 are attached to a frame 170. The frame 170, the rails 300, 305, the bearings 310, 320 and the drive assembly 150 together comprise the drive support carriage 200. The drive assembly 150, in the first exemplary embodiment shown, travels or transitions freely in both the vertical and horizontal directions relative to the transmission unit 1000.

The drive assembly 150 and the drive support carriage 200 are moved vertically to engage a traction wheel 1050 and drive the axle 1100 of the transmission unit 1000. In further exemplary embodiments, the drive assembly 150 can be stationary and the traction wheel 1050 can be movable to engage and disengage the transmission unit 1000. Such a device could likewise utilize a gearing mechanism to engage the axle to contact the weighted drive member 140. Still further exemplary embodiments may encase the weighted drive wheel 140, an at least one energy recovery device, for instance energy recovery device 120, and the traction wheel 1050 in a vacuum bottle or housing to aid in reducing friction on the weighted drive wheel.

The system operates, in the exemplary embodiment shown in FIG. 2, after switch 7 is turned "on" and energy is allowed to travel from the at least one power storage device 5 to the motor 100. The motor 100 is energized and begins turning the weighted drive member 140 in a disengaged state, away from the transmission unit 1000. A control input 47, a foot pedal in the exemplary embodiment shown, is connected to a controller 40 and when it is engaged the transmission unit 1000 is moved from a disengaged state to an engaged state. Non-limiting examples of the types of control inputs that can be used include foot pedals, levers, slideable switches, push button switches and any other suitable means of inputting control commands.

In the exemplary embodiment, a vehicle, for example a golf cart, an electric community vehicle, a boat, an aircraft, a helicopter, a wheelchair, or similar vehicle, is propelled until a further control input 48 is engaged or the release of control input 47 is sensed by the controller 40. The weighted drive wheel 140 is then returned to a disengaged state and allowed to idle, continuing to be turned by motor 100. In the exemplary embodiment depicted in FIG. 2, the motor 100 continues to turn the first energy recovery device 120, which returns energy to the at least one power storage device 5 while the vehicle is decelerated and while the vehicle is stopped. In alternative embodiments, those depicted in FIGS. 4, 6 and 8 below and in still further embodiments, any number of the energy recovery devices can be operated simultaneously with the motor or intermittently engaged while the motor is energized or engaged when the motor is de-energized without departing from the spirit of the invention. In these embodiments, a variety of methods can be used to cause intermittent engagement, including but not limited to mechanical intermittent engagement device, as disclosed in FIGS. 6 and 8, or through electrical mechanisms, including internal modifications to the energy recovery device that permit it to intermittently recover energy when turned by the driven weighted member 140.

In the first exemplary embodiment, as seen in FIGS. 2 and 3, the drive assembly 150 and the carriage 200 are raised and lowered by a vertical adjustment mechanism 240 and at least one biasing element 245. As a safety measure, the state of the system is by default is disengaged, at least one biasing element 245 keeping the carriage 200 and the weighted drive member 140 away from the traction member 1050 and the transmission unit 1000 in a disengaged state. However, in additional exemplary embodiments the vertical adjustment mechanism 240 can simply move the carriage 200 in the vertical direction, without the at least one biasing means 245. The vertical adjustment mechanism 240 is engaged to overcome the biasing means 240 and engage the transmission unit 1000. The vertical adjustment mechanism 240, can for instance be a motor and a camshaft. Additional vertical adjustment mechanisms can include but are not limited to spring members, screw gears, worm gears, ratcheting gear mechanisms, hydraulic pistons, and other suitable systems.

As seen in FIGS. 2, 3, 4, 6, 7 and 8, the drive system adjusts the speed at which it is driven or at which the vehicle is driven by the horizontal transitioning of the drive assembly 150, with the weighted drive member 140 on the support members or bearings 310, 320 relative to the traction member 1050. The distance away from the driven shaft 101 that the traction member 1050 is engaged by the weighted drive member 140 is proportional to the speed of the drive, as described further herein in detail. Additional embodiments can reverse this movement, such that the traction member 1050 moves across the stationary weighted drive member 140, resulting in the same energy recovery. Still further embodiments, particularly those with non-disc shaped drive and traction members or utilizing non-traction drives can utilize different adjustment mechanisms to adjust the speed at which they operate without departing from the spirit of the instant invention. It should also be noted that the horizontal transitioning of the drive support assembly 150 is shown for a single direction of travel of one member relative to another. In the application of the traction member 1050 to the weighted drive member 140, transitioning to either side of the weighted drive member 140 would be suitable for locomotion. Similarly, in the case of energy recovery devices that contact the weighted drive member, either side is suitable for driving the energy recovery device. In fact, in the case of locomotion, by transitioning to the opposite side of a disc shaped weighted drive member 140, as seen in FIG. 2, the drive would effectively be operating in reverse.

In the exemplary embodiment depicted in FIG. 2, the horizontal travel of the assembly 150, including the motor 10 and the first energy recovery device 120 120, is controlled by the controller 40 connected to a control input 47. A separate controller or control system can be utilized as well to separate speed control from transmission control. The controller 40 can be an electric control system, a hydraulic control system, a computer control system or any other suitable control system or combination of control system. The controller 40 in response to the control input 47 activates the transitioning motor 340 which in turn moves the motor support plate 130 in relation to the transmission unit 1000. One non-limiting example of a system for accomplishing this is a set of over-under rollers traveling along rails with a screw drive. Another non-limiting example would be the use of a set of linear bearings and a worm gear connected to a motor. The controller 40 can be utilized to control the position of the drive assembly 150 and the motor support carriage 200 in both the horizontal or vertical directions.

Figure 4A:
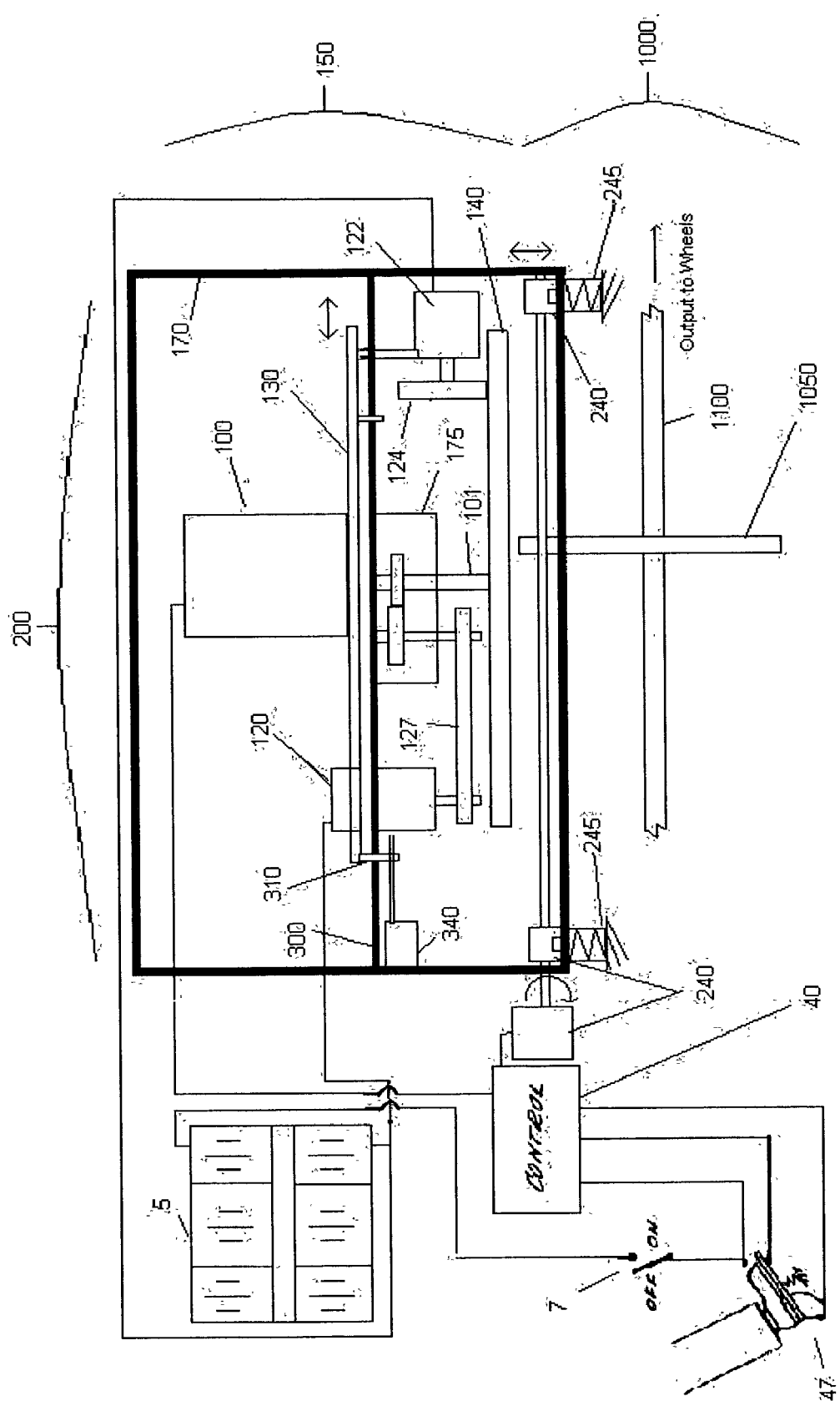
FIG. 4A shows a side view of a further exemplary embodiment utilizing additional energy return devices.

FIG. 4A shows a further example of the first exemplary embodiment utilizing additional energy return devices. The controller 40 can be coupled to engage additional energy recovery devices to recover energy from the drive system. These additional energy return devices can, in turn, engage the motor 100, the motor shaft 101, or the weighted drive member 140 directly or indirectly. In the exemplary embodiment shown in FIG. 4A, a second energy recovery device 122 is attached to plate 130 and, with the first energy recovery device 120, simultaneously contacts the weighted drive member 140 with a tractive wheel 124 that turns an second energy device 122. Alternatively, the second energy recovery device 122 can be made to intermittently contact the weighted drive wheel 140, for instant in a fashion similar to that show in FIG. 6. The second energy recovery device 122 returns additional energy to the at least one energy storage device 5. It should be noted, for all the embodiments disclosed, that the placement of any of the energy recovery devices can be interchanged and still result in a return of energy from the drive system. In addition, any of the energy recovery devices may be placed in permanent contact with or intermittent contact with the motor 100, the driven shaft 101, the weighted drive member 140 or other kinetically charged components of the drive system and recover energy. Also, the energy recovery devices can be operated while the motor 100 is energized or de-energized. In particular, embodiments with combinations of energy devices that are operated while the motor 100 is energized and while the motor 100 is de-energized are contemplated.

Figure 4B:
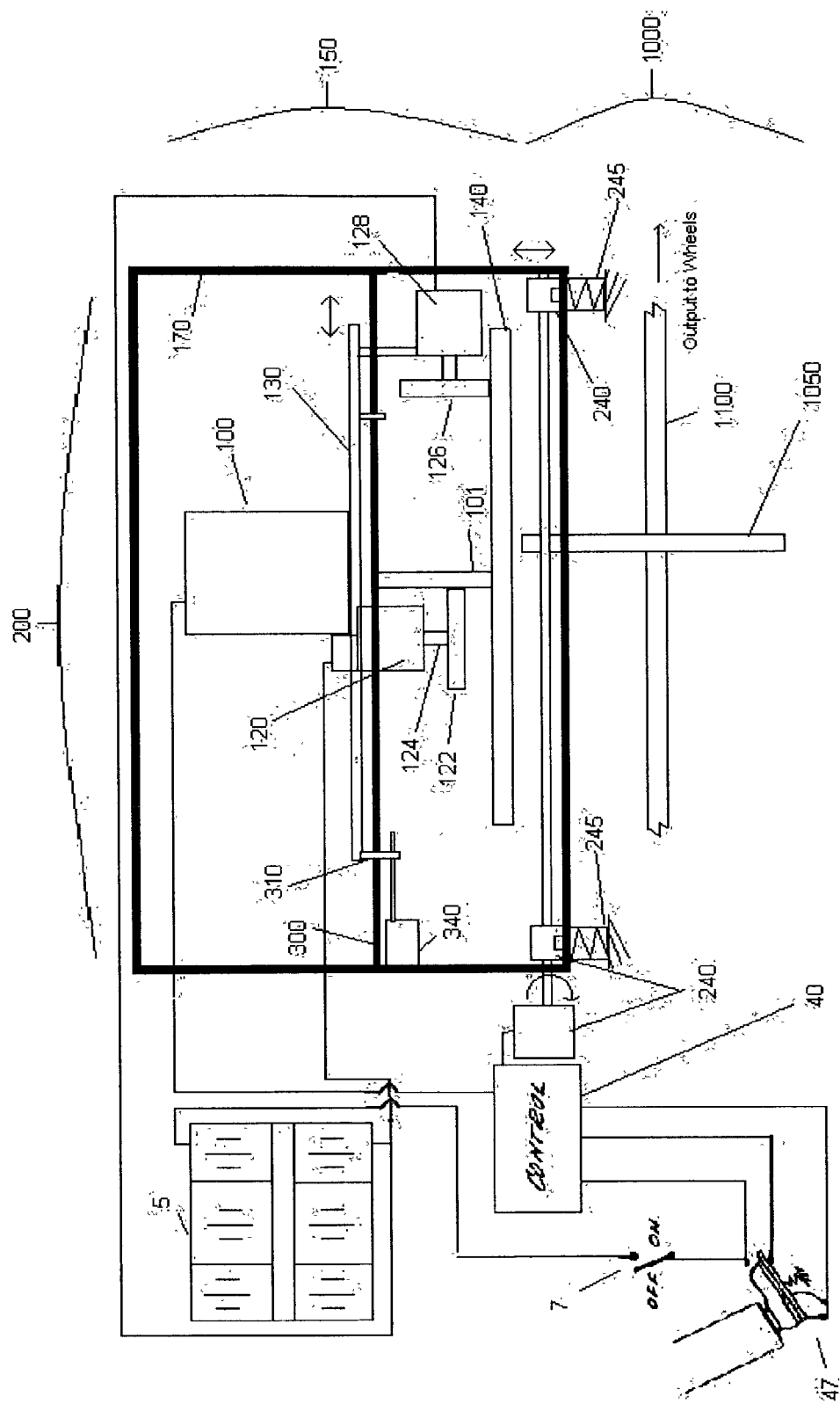
FIG. 4B shows a still further exemplary embodiment utilizing additional energy return devices.

FIG. 4B shows another side view of a still further example of the first exemplary embodiment utilizing additional energy return devices. The motor 100 is energized by an at least one power storage device 5 after switch 7 is turned on, the motor 100 driving the driven shaft 101 which is directly engaged with the first energy recovery device 120. The first energy recovery device comprising, in this embodiment, a tractive wheel 122 coupled to a shaft 124 extending from the first energy recovery device 120. The driven shaft 101 turns the tractive wheel 122 so that the energy recovery device 120 returns energy to the at least one power storage device 5 as long as the weighted drive member 140 is turning, in this embodiment this is as long as the switch 7 is engaged. A second energy recovery device 128 has a tractive wheel 126 that engages the weighted drive member 140, in the same manner as seen in FIG. 4A. The support carriage 200 and the engagement and disengagement of the drive unit 1000 are the same as that described in relation to FIG. 2.

Moreover, any number of energy recovery devices can also be added to any of the exemplary systems disclosed and may also include energy recovery devices connected to the transmission unit 1000 or the wheels of the system. An exemplary embodiment of an energy recovery device for contact with the wheels of the vehicle is described in relation to FIG. 11 below.

In still further embodiments described below in relation to FIGS. 6-10, the motor 100 can be de-energized after release of the first control input 47 and the second energy recovery device 122 and the first energy recovery device 120 can be intermittently engaged. In addition, as discussed in relation to FIG. 11 below, as the vehicle is slowed in both the first and second exemplary embodiments an added regenerative braking system 2000 can be used recover additional kinetic energies from the vehicle.

FIG. 5 shows a close up view of the coupling of the drive unit and the weighted drive member of the exemplary embodiment of the instant invention. In the exemplary embodiment a transmission unit 1000 is provided to engage the weighted drive member 140. The weighted drive member 140, as discussed above, is shown having a disc shape, but can be of any suitable shape. The weighted drive member 140 can be manufactured from metal, epoxies, ceramics, wood, plastic or other suitable material. A solid aluminum weighted drive member is one non-limiting example of a metal for construction of the weighted drive member 140.

The transmission unit 1000 comprises, at a minimum, a drive axle 1100 with at least one traction member 1050. Although a single traction member 1050 is shown, multiple traction members and multiple weighted drive members, used in equal multiples together or coupled to a dissimilar number of complimentary units, can be utilized without departing from the spirit of the instant invention. A hex shaft is shown, with hex hubs and hex bearings to permit free rotation of the drive axle 1100. However, any shaped axle can be utilized to provide the transmission of torque from the engagement of the weighted drive member 140 and the traction member 1050. In the exemplary embodiment snap rings and bolts with nuts on the outside of each hex hub hold a set of wheels 50 on the axle 1100. Again, alternative-fastening devices can be utilized to retain the wheels 50 on the axle 1100. The traction member 1050 is also shown as a disc shaped member and engages the weighted drive wheel 140 at a substantially ninety degrees angle relative to one another. Additional exemplary embodiments can utilize different shapes to engage the weighted drive member 140. These can include but are not limited to conical, radial, spheroid, toroid, elliptical or other shaped members to engage the weighted drive member 140. The traction member 1050 can be composed of any suitable material; for example a rubber or silicone based substance or other high friction material. The traction member 1050 can also be a single material throughout or may simply be a coating or surface application on the periphery of the member, such as that disclosed in FIG. 5 having hex hub 1040 with friction member 1050 on its periphery. Similarly, the position of the traction member 1050 and the weighted drive member 140 can be reversed, such that the traction member is turned and the weighted drive wheel is mounted on the axle without departure from the spirit of the invention.

In the embodiment shown in FIG. 5, a metal hex hub 1040 is located on the axle 1100 and has the traction member 1050 attached to its periphery. The weighted drive member 140 and the traction wheel 1050 engage at substantially about ninety degrees to the plane of the weighted drive member 140. In additional embodiments, the angle of engagement of the drive member 1050 and the weighted drive member 140 can be varied, this being particularly dependent of the relative shapes of the members. For the embodiment utilizing the disc shaped weighted drive member 140 and the disk shaped traction member 1050 shown, an angle substantially between about 45 and 90 degrees is practical, especially angles of substantially about 90 degrees. The weight, size, configuration, weight distribution, rotational speed and other physical variables play an important part in determining the energy storage capability of the weighted drive member 140. These variables are extremely dependent on the application for the drive system and can be determined in accordance with the operating conditions, the output power of the desired motor 100 and power requirements of the application. Optimization of these variables being within the skill of one of ordinary skill in the art.

The weighted drive member 140 is retained on the shaft 101 by an attachment element 163. A non-limiting example of an attachment element 163 is a keyway with a channel and retaining member, as shown. When the transmission unit 1000 is engaged by the drive assembly 150, power is transmitted to the wheels 50 and the vehicle moves.

Figure 6:
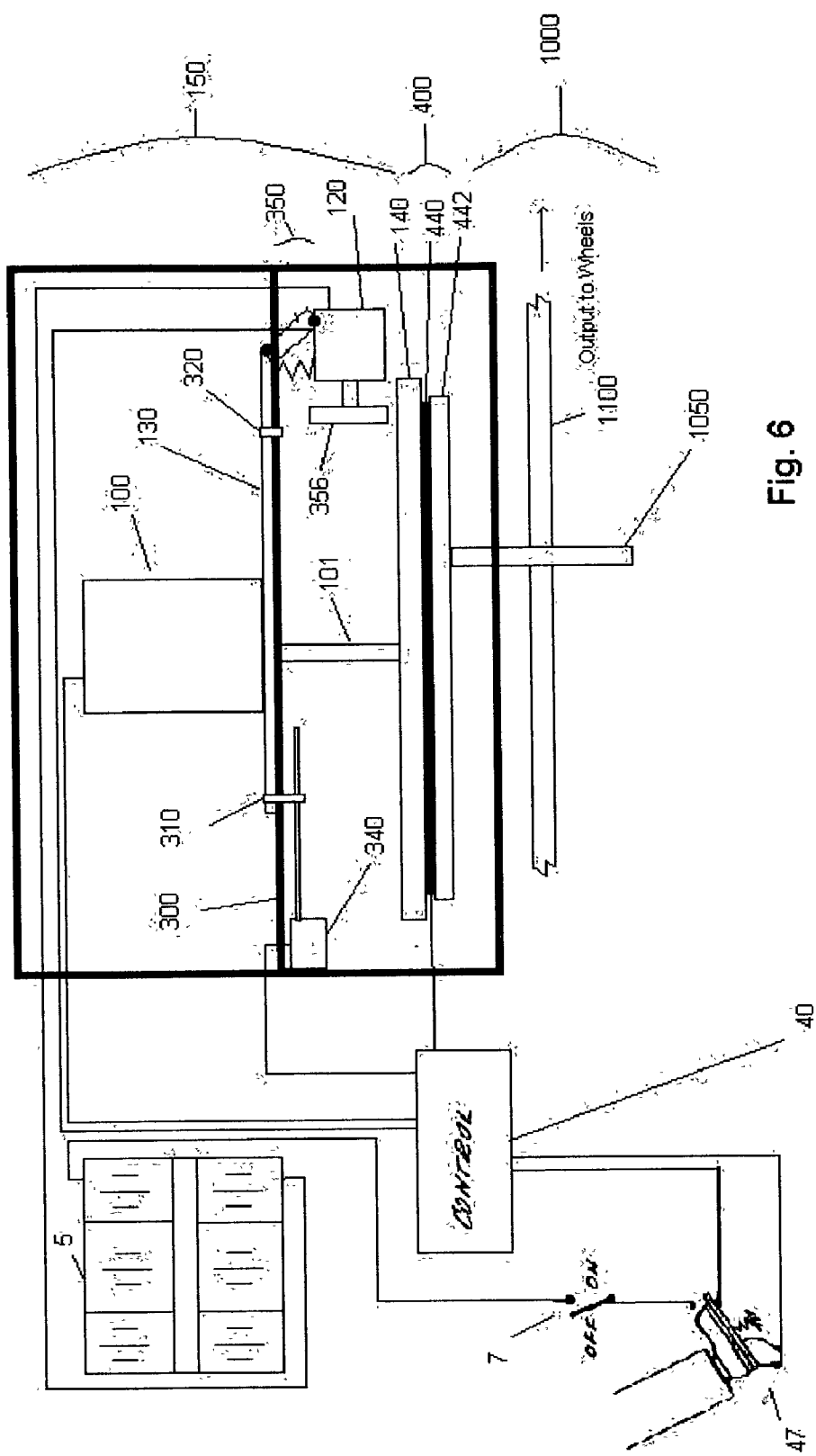
FIG. 6 shows a side view of an exemplary embodiment of the instant invention.
Figure 7:
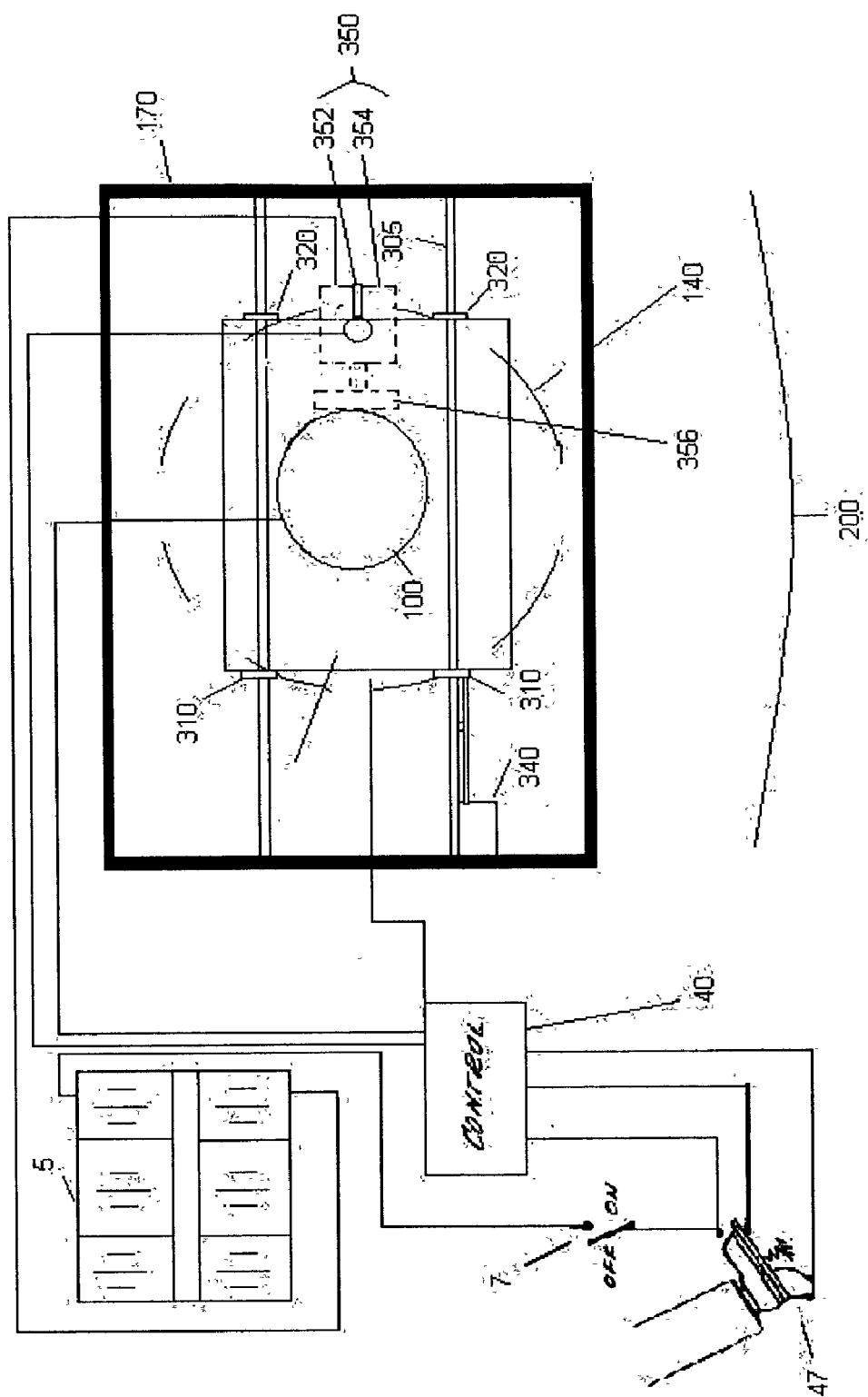
FIG. 7 shows a top view of the exemplary embodiment of FIG. 6.

FIGS. 6 and 7 show a side view and a top view, respectively, of a second exemplary embodiment of the instant invention. The additional exemplary embodiment is similar to the one described above in relation to FIGS. 1-4. It comprises a similar motor support carriage 200 with a power source or motor 100 and a weighted drive member 140 that is intermittently engaged with a transmission unit 1000. The drive unit is also constructed in the same way as that shown and described above.

However, in the case of the exemplary embodiment of FIGS. 6 and 7, the at least one power storage device 5 is connected by switch 7, through the control input 47, to the controller 40 and finally to the motor 100. Turning the switch 7 to the "on" position does not immediately energize the motor 100 as in the first exemplary embodiment described above in relation to FIGS. 2-4. Instead the control input 47, also depicted as a foot pedal in this exemplary embodiment, is connected to the controller 40 and, in response to engaging the control input 47, the motor 100 is energized by the controller 40. This begins turning the weighted drive member 140.

A clutch device 400 is located between the weighted drive member 140 and the transmission unit 1000. The clutch device 400 can comprise for example a clutch member 440 that rests between the weighted drive member 140 and a torque plate 442. The clutch member 440 is intermittently engaged and turns torque plate 442 that is engaged with the transmission unit 1000. The controller 40, in response to control input 47 or an additional control input (not shown) engages and disengages the clutch device 400. Clutch device 400 can, for example, be mechanical, hydrostatic, electrical or another suitable clutch device. The controller 40 engages the clutch device 400 to engage the transmission unit 1000 to turn wheels 50 and propel the vehicle. In additional embodiments, the controller can be programmed or otherwise designed to provide a delay to allow the motor 100 to spin up the weighted drive member 140 to a specified rotational speed before engaging the clutch device 400 with the traction member 1050.

The vehicle is propelled until the control input 47 is disengaged or an additional control input (not shown) is engaged and the controller 40 disengages the clutch device 400 and de-energizes the motor 100. The weighted drive member 140, however, continues to turn from the built up momentum of the weighted drive member 140. Simultaneously the first energy recovery device 120 is engaged by the controller 40 and is energized by the still turning weighted drive wheel 140. The first energy recovery device 120 returns power to the at least one power storage device 5 as the weighted drive member 140 slows.

Figure 8A:
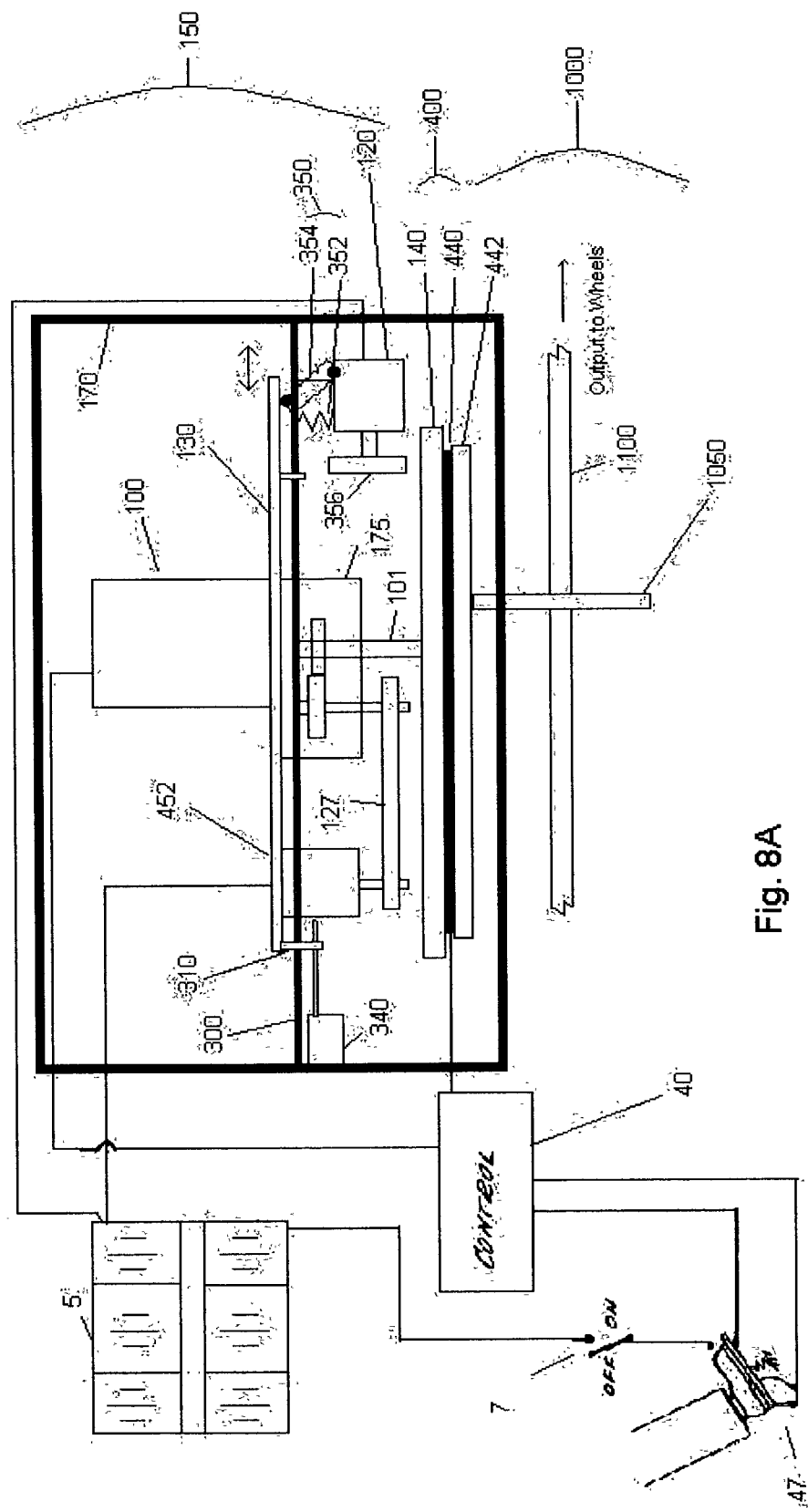
FIG. 8A shows a side view of yet a further exemplary embodiment utilizing additional energy return devices.
Figure 8B:
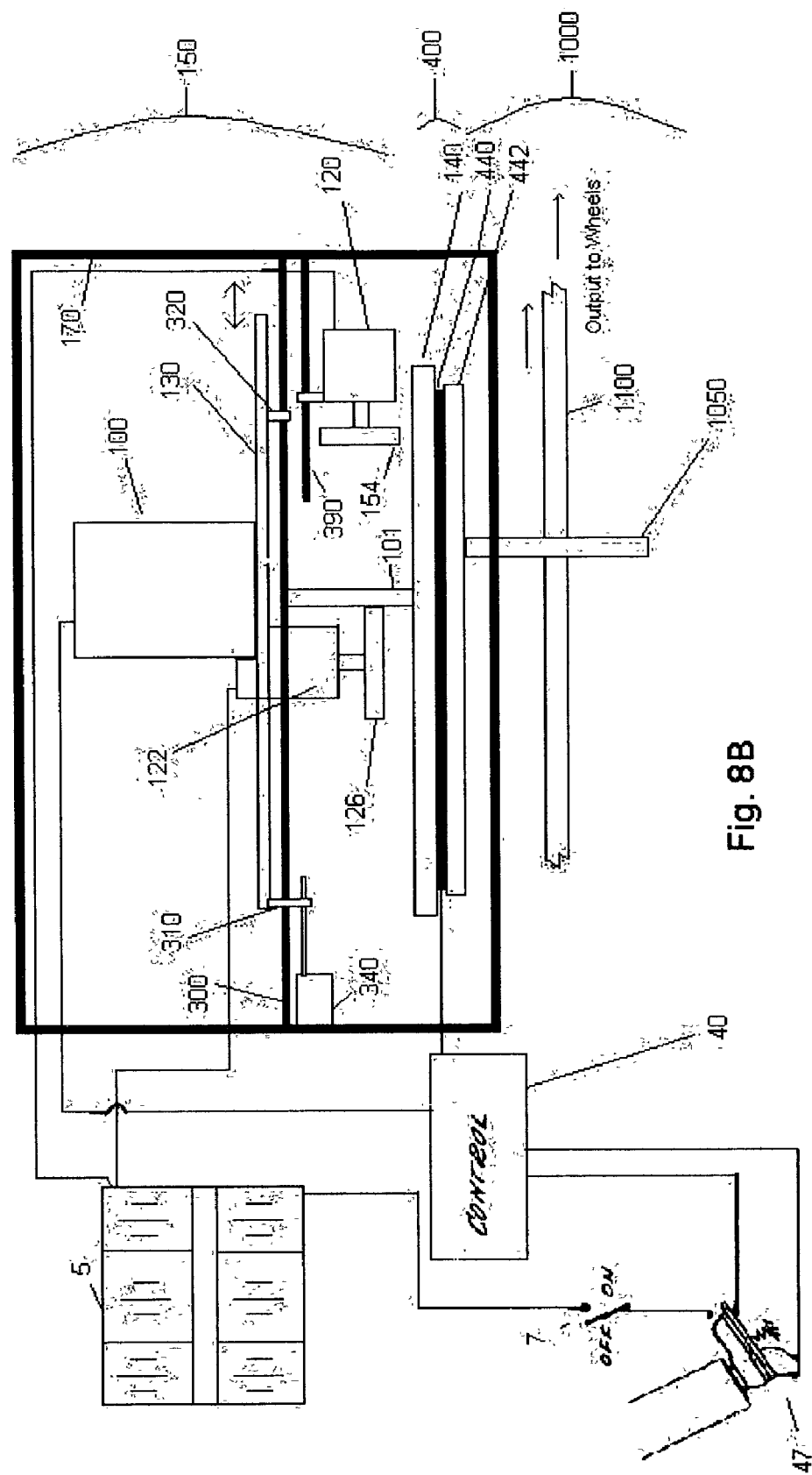
FIG. 8B shows a side view of a still further exemplary embodiment utilizing additional energy return devices.
Figure 8C:
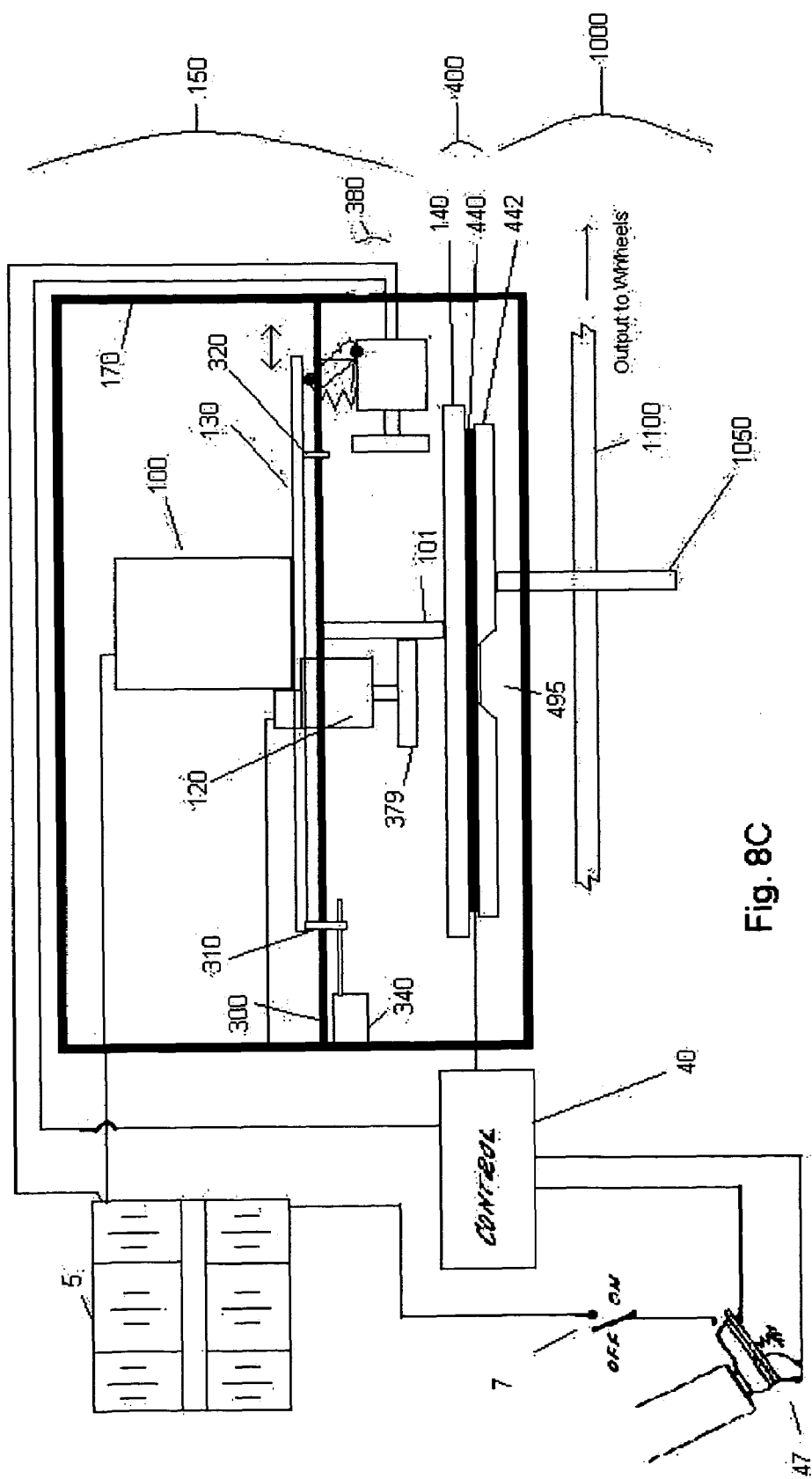
FIG. 8C shows a side view of a another exemplary embodiment utilizing additional energy return devices.

Additional energy recovery devices, as shown in FIGS. 8A-8C and in still further embodiments, can accompany the first energy recovery device 120. These additional energy recovery devices can be operated simultaneously with the motor 100, as in the first exemplary embodiment, or can be engaged intermittently upon de-energizing the motor 100, as described in relation to FIGS. 6-10. These energy recovery devices may also be directly mounted to the motor 100 or can be incorporated into the motor 100.

Additionally, in the example shown in FIGS. 6 and 7, the second exemplary embodiment has a fixed first energy recovery device 120 relative to the distance from the shaft 101. In additional embodiments, the first energy recovery device 120 can be permitted to move in or out on the weighted drive member 140, as described in greater detail in relation to FIG. 8A. Additionally, the first energy recovery device can be oriented to engage driven shaft 101 after the clutch device 400 is disengaged, as described in greater detail in relation to FIG. 8B.

FIG. 7 shows a top view of the embodiment of FIG. 6. The at least one power storage device 5 is shown coupled to the power source or motor 100 in the same manner and fashion as described above in relation to FIGS. 1-4. The motor can be for example an electric, hydraulic, or internal combustion motor or alternative fuel motors. Again, in the exemplary embodiment shown a conventional DC electric motor is depicted, however the device is equally suited for internal combustion engines. The motor 100, the drive assembly 150, and the motor support carriage 200 are similar to the embodiment depicted in FIGS. 1-4. The support carriage 200 still retains a drive assembly 150, a frame 170, and support rails 300, 305. The drive assembly 150 is mounted on similar sets of rails 300, 305 with sets of support members or bearings 310,320. However, in the second exemplary embodiment the need for vertical transitioning to disengage the motor 100 and weighted drive member 140 from the transmission unit 1000 has been eliminated by the addition of clutch device 400 making the embodiment more compact.

The drive assembly 150 still travels or transitions freely in the horizontal direction relative to the transmission unit 1000 to control the speed of the vehicle. This can be accomplished in a manner similar to that described above in relation to FIGS. 1-4, utilizing a transitioning motor 340 coupled to the drive assembly 150 to move the assembly 150 and the weighted drive member 140 over the traction member 1050. The horizontal travel of the assembly 150, including the motor 100 and the first energy recovery device 120, is controlled by controller 40 connected to a control input 47 or an additional control input. The top speed of the vehicle increases as the traction drive member 1050 is moved further out on weighted drive member 140. The first energy recovery device 120 is mounted thorough intermittent engagement device 350 to the frame 170 or the rail 300 and remains in contact with the weighted drive wheel 140 at a set distance in the exemplary embodiment shown.

It should be noted that variations in the placement, type, and activation sequence of the control units and inputs are contemplated to suit specific applications and requirements. For example, a further variation of the second exemplary embodiment of the instant invention is described in relation to FIG. 6B.

FIG. 8A shows a side view of a further example of the second exemplary embodiment utilizing additional energy return devices. The second exemplary embodiment includes a first energy recovery device 120. The first energy recovery device 120 can be engaged intermittently, for instance only during periods of deceleration, or can be permanently engaged when the motor 100 is turning through intermittent engagement device 350. Intermittent engagement device 350 can, for instance, be a spring 352 and a rocker arm 354 that can engage and disengage the tractive wheel 356 and thus engage and disengage the first energy recovery device 120 depending on operating conditions.

A second energy recovery device 452 is coupled to the support plate 130. The second energy recovery device 452 is driven directly from the motor 100 in a manner similar to the embodiment disclosed in FIGS. 2 and 4. The second energy recovery device can be driven while the motor 100 is energized or can be intermittently activated electrically, via circuitry in the motor or the controller, or mechanically, by physically separating the energy recovery device, by controller 40 and engaged only when motor 100 is de-energized. The second energy recovery device is driven by a gearbox 175 coupled to motor 100 and a pulley 127. Additionally, as in all the embodiments, the management of the rate of recharge or power demand on the batteries can be managed by microprocessors or like devices.

FIG. 8B shows a side view of a still further example of the second exemplary embodiment utilizing additional energy return devices. In an alternative embodiment the first energy recovery device 120 can be mounted on the motor support carriage 200 so that it can be moved relative to the driven member 140. The first energy recovery device 120 is shown on energy recovery device rail 390 with a micromotor (not shown) moving it horizontally relative to the weighted driven member 140. The first energy device 120 is intermittently engaged in the embodiment as shown. However, the first energy device 120 may also be permanently in contact with the driven member 140. The tractive wheel 154 moves over the top of the weighted drive wheel as the wheel returns to its starting position or can be adjusted to an optimum rotational speed on the wheel. The first energy recovery device 120 is controlled by the controller 40. A second energy recovery device 122 is coupled directly to shaft 101 through a tractive wheel 126 that is turned simultaneously with driven member 140. Alternatively, the tractive wheel 126 can be intermittently engaged with the shaft 101. The second energy recovery device 122 is mounted on the support plate 130 and coupled directly to the driven shaft 101 of the motor 100. The tractive wheel 126 runs so long as the driven shaft 101 turns.

FIG. 8C shows a side view of a still further example of the second exemplary embodiment utilizing additional energy return devices. The motor 100 turns a driven shaft 101 that is coupled to energy recovery device 120 through direct contact of a tractive wheel 379 with the driven shaft 101. The energy recovery device 120 is electrically coupled to the at least one power storage device 5 and returns a portion of the energy expended to energize the motor 100, the energy recovery device 120 continuing to turn even after motor 100 is de-energized. Again, further embodiments of the instant invention can drive the energy recovery device 120 utilizing a pulley system or by direct engagement with the driven shaft 101 of the motor 100. Similar to the embodiment of FIG. 6, a second energy recovery device 380 is coupled to the support plate 130 and intermittently engaged with the outer edges of the driven member 140. The second energy recovery device 380 being coupled to the at least one power storage device 5 and returning energy when engaged with the weighted drive member 140.

A depression section may also be provided to supplement or replace any clutch or disengagement means previously disclosed. FIG. 5 shows an embodiment of the weighted drive member 140 with a depression section 495. The depression section allows the weighted drive member 140 to be turned without engaging the traction member 1050, effectively putting the system in neutral without the need for vertical transitioning or added clutch mechanisms. A still further embodiment of the weighted drive member 140 with a depression section 495 can be seen in FIG. 8c. This embodiment utilizes a combination of a weighted drive member 140 with a clutch mechanism 400, having a clutch member 420 and a clutch plate 442, with a depression section 495 in the clutch plate. This would provide additional safety through a redundancy, requiring the clutch mechanism 400 to be activated by the controller 40 to engage the torque plate 420 and then the movement of the weighted driven member 140 and the clutch mechanism 400 a sufficient distance to move the traction member 1050 from the depression section 495 to contact with the torque plate 442.

Figure 11:
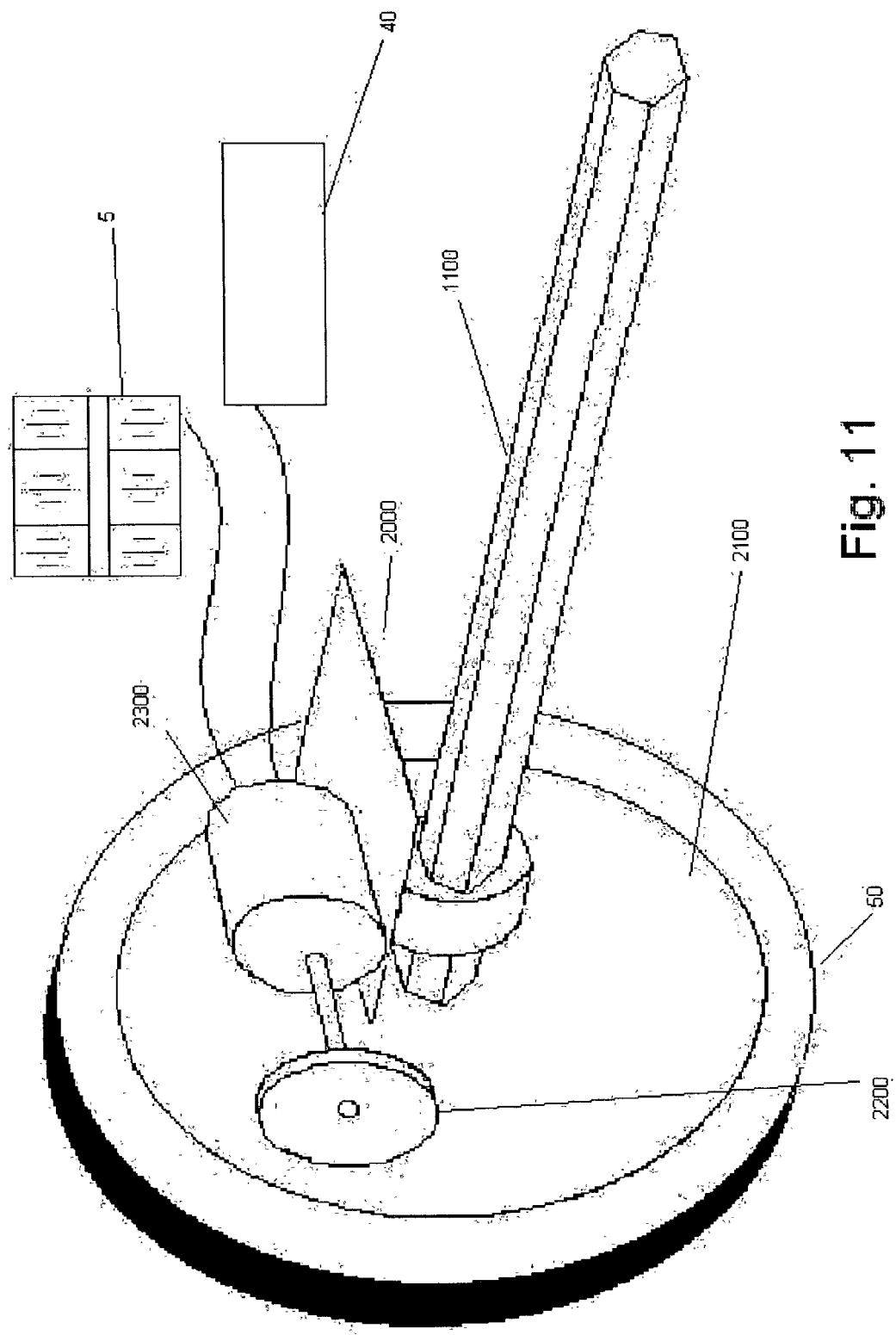
FIG. 11 shows an exemplary embodiment of an energy recovery device system for engaging the wheels or axle of a vehicle.

FIG. 11 shows an exemplary embodiment of an energy recovery device system for engaging the wheels or axle of a vehicle. Any of the exemplary embodiments of the instant invention disclosed can be utilized in conjunction with a regenerative braking system 2000. An exemplary embodiment of such a breaking system 2000 can comprise a hub 2100, the hub being mounted to the axle 1100 or in the wheels 50. A tractive wheel 2200 controlled by controller 40 is put in intermittent contact with the hub 2100 during breaking, as sensed by activation of a breaking control input (not shown). The hub 2100 turns the tractive wheel 2200, which turns an at least one energy recovery device 2300. The at least one energy recovery device 2300 is coupled to the at least one power storage device 5 and returns power thereto. Thus, when the vehicle is braking, additional energy is recovered by the regenerative breaking system 2000. In FIG. 12, an all wheel drive vehicle is depicted. The vehicle 11000a has one embodiment of the drive mechanism 11000b, 11000c, 11000d, 1000e, of the instant invention mounted at each wheel 12000b, 12000c, 12000d, and 12000e respectively. The drive mechanisms 11000b, 11000c, 11000d, and 11000e can be for instance be any of the drive mechanisms disclosed in the accompany FIGS. 1-11 above, any similar devices, or can specifically be modified to fit in the tight spaces around the wheels of the vehicle without departing from the spirit of the invention.

The regenerative braking system 2000 can include or be supplanted by an energy recovery system for recovering energy from the axle of the vehicle. The energy recovery system for the axle of a vehicle can comprise a drive member on the axle, for instance a disc shaped member, is coupled to the axle of the vehicle. A traction member, for example a disc shaped member with a high friction surface, is located proximate to the drive member on the axle and placed intermittently in contact with the drive member on the axle. The traction member is coupled, by a shaft for example, to an axle energy recovery device. The axle energy recovery device is coupled to the at least one power storage device for the vehicle. The disc shaped traction member on the axle can be put in contact with the drive member on the axle when the vehicle reaches a specified speed or when the vehicle is breaking or both. The traction member on the axle can be fixed or it can me made to move in or out along the drive member on the axle.

The embodiments, exemplary embodiments, and examples discussed herein are non-limiting examples. The invention is described in detail with respect to exemplary embodiments, and it will now be apparent from the foregoing to those skilled in the art that changes and modifications can be made without departing from the invention in its broader aspects. The invention, therefore, as defined in the claims is intended to cover all such changes and modifications as fall within the true spirit of the invention.

What is claimed is:

1. A vehicle with an energy recovery drive system comprising:
a vehicle frame;
a drive support assembly including a weighted drive member, an at least one electric motor, a motor support plate, and a motor support carriage, wherein the drive support assembly is coupled to and movable relative to said vehicle frame;
at least one power storage device coupled to said frame and electrically coupled to said motor;
a driven shaft driven by said motor;
an at least one energy recovery device coupled to said driven shaft and turning at all times said driven shaft is turning; and
a drive unit selectively driven by said at least one electric motor and driving an at least one set of driven wheels, wherein the vertical movement of the entire drive support assembly relative to the drive unit couples or decouples the motor from the drive unit.

2. The vehicle of claim 1, wherein the weighted driven member is at a distal end of said driven shaft and wherein said drive unit is a traction member that is coupled to said driven shaft through the intermittent engagement with said weighted driven member such that said at least one set of driven wheels is selectively engageable through the intermittent engagement of the traction member with the weighted drive member.

3. The vehicle of claim 1, wherein said drive unit includes an infinitely variable transmission with at least one moving part of the infinitely variable transmission coupled to and driving said at least one energy recovery device and simultaneously through the infinitely variable transmission coupled to and driving said at least one set of driven wheels.

4. The vehicle of claim 2, wherein said weighted drive member is an aluminum disc and is coupled to said driven shaft so as to be raised and lowered with said drive support assembly.

5. The vehicle of claim 1, wherein said at least one energy recovery device further comprises a first energy recovery device.

6. The vehicle of claim 5, wherein said first energy recovery device returns at least 10% of the energy used by said at least one motor.

7. The vehicle of claim 5, wherein said first energy recovery device returns at least 30% of the energy used by said at least one motor.

8. The vehicle of claim 5, wherein said first energy recovery device returns at least 60% of the energy used by said at least one motor.

9. The vehicle of claim 5, wherein said at least one energy recovery device further comprises a second energy recovery device.

10. The vehicle of claim 9, wherein said second energy recovery device is coupled to said at least one set of driven wheels.

11. The vehicle of claim 9, wherein said second energy recovery device is coupled to said at least one electric motor.

12. The vehicle of claim 11, wherein said second energy recovery device is coupled to said driven shaft.

13. The vehicle of claim 2, wherein the distance at which the weighted drive member contacts the traction member along a first side from a center point of the weighted drive member is proportional to the speed of the vehicle.

14. The vehicle of claim 1, distance at which the weighted drive member contacts the traction member along a second side from a center point of the weighted drive member is proportional to the speed in reverse of the vehicle.

15. The vehicle of claim 1, wherein said at least one set of driven wheels further comprises a first and second set of wheels, said first and second set of wheels being driven simultaneously by said at least one motor.

16. The vehicle of claim 1, wherein said at least one energy recovery device is mounted to said vehicle frame to return energy from motion of said vehicle.

17. A drive system comprising:
at least one power storage device;
a drive support assembly including an at least one motor intermittently energized and de-energized through coupling to the at least one power storage device, a weighted drive member coupled to the at least one motor, and a motor support plate, the drive support assembly being coupled to a motor support carriage and the motor support carriage being coupled to and being movable in a vertical direction relative to a frame;
an at least one energy recovery device returning energy to the at least one power storage device when the motor is energized; and
a drive unit coupled to said at least one weighted drive member such that the motor drives the at least one weighted drive member which in turn drives the drive unit, wherein when the at least one weighted drive member is disengaged from the drive unit through the vertical movement of the motor support carriage, the weighted drive member remains in an energized state and at least one energy recovery device continues to return energy to the power storage device so long as the weighted drive member is driven.

18. The drive system of claim 17, wherein the at least one energy recovery device is coupled to the weighted drive member.

19. The drive system of claim 17, further comprising a clutch device intermittently engaged to couple the weighted drive member and the drive unit.

20. The drive system of claim 17, further comprising a switch that controls the flow of power from the power storage device to a controller that is coupled to the at least one motor, the controller energizing the at least one motor in response to the condition of the switch.

21. The drive system of claim 17, wherein the mass of the weighted drive member is concentrated towards the outside of the shape of the weighted drive member.

22. The drive system of claim 17, wherein the at least one energy recovery device is intermittently coupled to the weighted drive member through an intermittent engagement device.

23. The drive system of claim 17, wherein the weighted drive member is one of a conical, radial, spheroid, toroid, or elliptical shape.

24. The drive system of claim 17, wherein the weighted drive member is constructed from at least one of metals, epoxies, ceramics, woods, or plastics.

25. The drive system of claim 17, wherein the at least one energy recovery device is coupled to the weighted drive member.

26. The drive system of claim 17, wherein the at least one energy recovery device is coupled to the motor.

27. The drive system of claim 17, wherein the at least one energy recovery device is a tractive member coupled to an energy recovery mechanism.

28. The drive system of claim 27, wherein the energy recovery mechanism is at least one of a generator, an alternator, a permanent magnet device or a stator.

29. The drive system of claim 17, further comprising a controller, wherein said at least one energy recovery device is intermittently engaged in response to a control input from said controller.

30. The drive system of claim 29, wherein the control input is at least one of a foot pedal, a lever, a slideable switch, or a push button switch.

31. The drive system of claim 17, wherein the weighted drive member is a weighted disk-shaped member.

32. The drive system of claim 31, wherein the weighted disk-shaped member has a substantial amount of weight concentrated towards an outer diameter of the member.

33. The drive system of claim 17, wherein the at least on energy recovery device further comprises a first energy recovery device.

34. The drive system of claim 33, wherein the weighted drive member is intermittently coupled to the first energy recovery device through an intermittent engagement device, so that said weighted drive member drives said first energy recovery device when said intermittent engagement device is engaged.

35. The drive system of claim 34, wherein the first energy recovery device is a tractive member coupled to an energy recovery mechanism.

36. The drive system of claim 35, wherein the energy recovery mechanism is an at least one of an at least one generator, alternator or stator.

37. The drive system of claim 33, further comprising a controller, wherein the intermittent engagement device is coupled to the controller.

38. The drive system of claim 37, wherein the controller selectively engages the energy recovery device with the weighted drive member in response to a change in a control input.

39. The drive system of claim 33, wherein the intermittent engagement device is one of a spring with tension arm and micro controller, a switch with a motor and a screw, or a clutch mechanism.

40. The drive system of claim 17, wherein the drive unit is one of a traction drive unit, a hydrostatic drive unit, or an infinitely variable gear ratio drive unit.

41. The drive system of claim 33, wherein said at least one energy recovery device further comprises an additional energy recovery device returning power to the at least one energy storage device while the weighted drive member is moving.

42. The drive system of claim 33, wherein said at least one energy recovery device further comprises three or more energy recovery devices.

43. The drive system of claim 33, wherein said at least one energy recovery device further comprises a drive unit energy recovery device for recovering energy from the drive unit when the drive system is moving.

44. The drive system of claim 1, wherein the at least one power storage device comprises a plurality of batteries storing electrical energy.

45. A drive system comprising:
an at least one power storage device;
a drive support assembly including an at least one motor intermittently energized and de-energized through coupling to the at least one power storage device, a weighted drive member coupled to the at least one motor, and a motor support plate, the drive assembly being coupled to a motor support carriage and the motor support carriage being coupled to and being movable in a vertical and horizontal direction relative to a frame;
an at least one energy recovery device returning energy to the at least one power storage device; and
a drive unit coupled to said at least one weighted drive member such that the at least one motor drives the at least one weighted drive member which in turn drives the drive unit, wherein when the motor is de-energized and the at least one weighted drive member is disengaged from the drive unit through the vertical motion of the motor support carriage, the weighted drive member remains in an energized state due to its kinetic enemy but is not driven by the at least one motor and the at least one enemy recovery device returns enemy to the power storage device.

46. The drive system of claim 45, wherein the at least one energy recovery device is intermittently applied to the weighted drive member upon de-energization of the motor.

47. The drive system of claim 45, wherein the drive system is used in a vehicle and the drive system continues to return energy to the at least one power storage device even after the vehicle is stopped.

48. The drive system of claim 45, wherein the at least one energy recovery device is simultaneously engaged with said at least one motor and continues to operate after the at least one motor is de-energized, recovering the kinetic energy remaining in the system.

49. The drive system of claim 45, wherein the energy recovery device operates after the drive unit has stopped being driven.

50. The drive system of claim 45, wherein the at least one energy recovery device is coupled to the weighted drive member.

51. The drive system of claim 45, further comprising a control input that controls the flow of power from the at least one power storage device to a controller that is coupled to the at least one motor, the controller energizing the at least one motor in response to the control input.

52. The drive system of claim 45, wherein the mass of the weighted drive member is concentrated towards a periphery of the shape of the weighted drive member.

53. The drive system of claim 45, wherein the at least one energy recovery device is intermittently coupled to the weighted drive member through an intermittent engagement device.

54. The drive system of claim 45, wherein the at least one energy recovery device is directly coupled to the weighted drive member.

55. The drive system of claim 45, wherein the at least one energy recovery device is coupled to the motor.

56. The drive system of claim 45, wherein the at least one energy recovery device is a tractive member coupled to an energy recovery mechanism.

57. The drive system of claim 56, wherein the energy recovery mechanism is a generator, an alternator, a permanent magnet device or a stator.

58. The drive system of claim 51, wherein the controller intermittently engages said at least one energy recovery device in response to a control input.

59. The drive system of claim 58, wherein the control input is one of a foot pedal, a lever, a slideable switch, or a push button switches.

60. The drive system of claim 45, wherein the weighted drive member is a weighted disk-shaped member.

61. The drive system of claim 60, wherein the weighted disk-shaped member has a substantial amount mass concentrated along an outer diameter of the member.

62. The drive system of claim 45, wherein the at least on energy recovery device further comprises a first energy recovery device.

63. The drive system of claim 62, wherein, the weighted drive member is intermittently coupled to the first energy recovery device through an intermittent engagement device.

64. The drive system of claim 63, wherein the first energy recovery device is a tractive member coupled to an energy recovery mechanism.

65. The drive system of claim 64, wherein the energy recovery mechanism is one of a generator, an alternator, a permanent magnet device or a stator.

66. The drive system of claim 63, further comprising a controller, wherein the intermittent engagement device is coupled to the controller.

67. The drive system of claim 66, wherein the controller selectively engages the at least one energy recovery device in response to a control input.

68. The drive system of claim 67, wherein the intermittent engagement device is one of a spring with tension arm and micro controller, a switch with a motor and a screw or a clutch mechanism.

69. The drive system of claim 45, wherein the drive unit is one of a traction drive train, a hydrostatic drive train, or an infinitely variable gear ratio transmission.

70. The drive system of claim 62, wherein the at least one energy recovery device further comprises a second energy recovery device.

71. The drive system of claim 45, wherein the at least one energy recovery device further comprises three or more energy recovery devices.

72. The drive system of 70, wherein the at least one energy recovery device further comprises a third energy recovery device for recovering energy from the drive unit when the drive unit is moving.

73. The drive system of claim 70, wherein the at least one energy recovery device further comprises a third energy recovery device for recovering energy from an at least one set of wheels driven by the drive unit.

74. A drive system comprising:
a drive support carriage comprising a frame, a set of rails, and at least one set of bearings providing support for a drive assembly comprising a weighted drive member, an at least one power source, and a power source support plate, wherein the at least one weighted drive member is moved so as to be intermittently engaged with a transmission unit through an at least one traction member, wherein the weighted drive member is moved vertically to engage the at least one traction member and the drive support carriage transitions freely in both vertical and horizontal directions relative to the transmission unit within the drive support carriage; and
an at least one energy recovery device is coupled to the at least one power source and driven simultaneously with the weighted drive member.

75. The drive system of claim 74, further comprising an at least one power storage device, the power source coupled to the at least one power storage device and a switch coupled to the at least one power storage device and to a controller, the switch energizing or de-energizing the at least one power source through the controller.

76. The drive system of claim 74, wherein the at least one power storage device is a battery bank.

77. The drive system of claim 74, wherein the power source is one of an electric, a hydraulic, or internal combustion motor.

78. The drive system of claim 77, wherein the power source is a DC electric motor.

79. The drive system of claim 74, further comprising a driven shaft extending from the power source having a gear box and a belt pulley coupled to the driven shaft and the at least one energy recovery device.

80. The drive system of claim 74, wherein the energy recovery device is an alternator.

81. The drive system of claim 74, wherein the at least one energy recovery device is coupled to the at least one power storage device to return energy to the at least one power storage device.

82. The drive system of claim 74, wherein the at least one energy recovery device is coupled to an at least one electrical accessory.

83. The drive system of claim 82, wherein the at least one electrical accessory is at least one of a GPS system, a sound system, and an air conditioning system.

84. The drive system of claim 74, wherein the at least one power source provides the at least one drive member with momentum and the at least one energy recovery device is driven by the momentum of the weighted drive member.

85. The drive system of claim 74, wherein the weighted drive member is a disc shaped member.

86. The drive system of claim 74, wherein the drive member is one of a conical, radial, spheroid, toroid, or elliptical shaped weighted drive member.

87. The drive system of claim 85, wherein disc shaped weighted member has a concentration of mass on an outer circumference of the member.

88. The drive system of claim 74, further comprising a drive assembly, the drive assembly comprising the motor, a gearbox coupled to the motor, and a motor support plate.

89. The drive system of claim 88, wherein the at least one energy recovery device comprises a first energy recovery device coupled via a pulley to the gearbox.

90. The drive system of claim 89, wherein the energy recovery device further comprises at least one of additional belt pulleys, gearing, electrical circuitry, electrical components or sensors.

91. The drive system of claim 88, further comprising sensors and electrical devices and a controller, wherein the sensors and electrical devices communicate the condition of at least one of the at least one power storage device, the drive assembly, and the transmission unit to the controller.

92. The drive system of claim 74, wherein the traction member is coupled to the transmission unit.

93. The drive system of claim 74, wherein the weighted drive member and a traction member are moved relative to one another to engage and disengage the transmission unit.

94. The drive system of claim 93, wherein the weighted drive member and the traction member are moved horizontally relative to one another to adjust the speed at which the transmission unit is driven.

95. The drive system of claim 74, further comprising a vacuum housing encasing the weighted drive member, the at least one energy recovery device, and the traction member.

96. The drive system of claim 74, further comprising at least one biasing element, wherein the biasing element raises the drive assembly and the drive support carriage and keeps the transmission unit disengaged from the weighted drive member.

97. The drive system of claim 96, further comprising a vertical adjustment mechanism that lowers the drive assembly and the drive support carriage against the at least one biasing element.

98. The drive system of claim 74, further comprising a horizontal adjustment mechanism for movement of the drive assembly in the horizontal direction relative to the transmission unit.

99. The drive system of claim 98, wherein the vertical adjustment mechanism is at least one of a motor and a camshaft, a spring member, a screw gear, a worm gear, a ratcheting gear, or a hydraulic piston.

100. The drive system of claim 99, further comprising a controller for controlling a horizontal transitioning of the transmission unit relative to the drive assembly.

101. The drive system of claim 99, further comprising a controller for controlling the vertical transitioning of the drive support carriage relative to the transmission unit.

102. The drive system of claim 99, wherein the drive assembly moves on the support rails supported by the support members of the drive support carriage.

103. The drive system of claim 74, wherein the position of the weighted drive member relative to the transmission unit adjusts the speed at which the drive system is driven.

104. The drive system of claim 103, wherein a controller is connected to a control input.

105. The drive system of claim 103, wherein the controller is one of an electric control system, a hydraulic control system, a computer control system or a combination therein.

106. The drive system of claim 104, wherein the controller in response to the control input activates a transitioning motor which in turn moves at least one of the drive support carriage or drive assembly in relation to the transmission unit.

107. The drive system of claim 96, wherein the support members are a set of over-under rollers traveling along rails with a screw drive.

108. The drive system of claim 96, wherein the set of bearings are a set of linear bearings and further comprising a worm gear connected to a motor.

109. The drive system of claim 104, wherein the controller can be utilized to control the position of the drive assembly and the drive support carriage in both horizontal and vertical directions.

110. The drive system of claim 74, further comprising additional energy return devices coupled to the at least one power source.

111. The drive system of claim 74, further comprising additional energy return devices that are coupled to a driven shaft associated with the at least one power source.

112. The drive system of claim 74, further comprising additional energy return devices coupled directly to the weighted drive member.

113. The drive system of claim 74, further comprising additional energy return devices coupled indirectly to the weighted drive member.

114. The drive system of claim 74, wherein the at least one energy recovery device is a first energy recovery device and a second energy recovery device.

115. Tic drive system of claim 114, wherein the first and second energy recovery devices simultaneously contact the weighted drive member with a respective first tractive and first and second tractive wheel that turns the second energy recovery device.

116. The drive system of claim 115, wherein the second energy recovery device intermittently contacts the weighted drive member.

117. A drive system comprising:
at least one power storage device;
a motor support carriage with a motor assembly, the motor assembly including at least one motor coupled to the at least one power storage device, wherein the motor is initially de-energized and the motor becomes energized when coupled to the power storage device;
a weighted drive member driven by the motor and intermittently engaging a transmission unit and wherein a traction member is intermittently moved in a vertical or horizontal direction relative to the weighted drive member and couples the energy return device to the at least one weighted drive member;
a clutch device between the weighted drive member and a torque plate, the torque plate communicating with the transmission unit; and at least one energy return device coupled to the at least one power storage device and intermittently engaged when the motor is de-energized.

118. The drive system of 117, further comprising a switch coupled between the at least one power storage device and the motor, wherein the switch de-energizes and energizes the motor.

119. The drive system of 118, wherein the switch is coupled to a control input.

120. The drive system of 119, wherein the control input is coupled to a controller that is coupled to the motor and the controller activates the motor in response to input from the control input.

121. The drive system of 120, wherein in response to engaging the control input the motor is energized by the controller.

122. The drive system of 117, wherein the torque plate is intermittently engaged with the transmission unit.

123. The drive system of 122, further comprising a controller and a control input, wherein signals from the control input activates the controller, which engages and disengages the clutch device.

124. The drive system of 122, further comprising a controller and a control input and an additional control input, wherein signals from the control input activate the clutch device and signals from the additional control input disengages the clutch device.

125. The drive system of 117, wherein the clutch device is one of a mechanical, a hydrostatic, or an electrical.

126. The drive system of 121, wherein the controller provides a delay to allow the motor to spin up the weighted drive member to a specified rotational speed before engaging the traction member.

127. The drive system of 117, wherein the motor is one of an electric, a hydraulic, or an internal combustion motor.

128. The drive system of 127, wherein the motor is a DC electric motor.

129. The drive system of 127, wherein the motor is an internal combustion engine.

130. The drive system of 117, wherein the a motor support carriage comprises a frame, at least one set of support rails and at least one set of support members.

131. The drive system of claim 130, further comprising a drive assembly comprising the weighted drive member, the motor assembly, a motor support plate, and the at least one energy recovery device, the drive assembly being coupled to the motor support carriage.

132. The drive system of 131, wherein the drive assembly is supported on the least one set of support rails with the at least one set of support members.

133. The drive system of 132, wherein the drive assembly transitions freely in the horizontal direction relative to the transmission unit to control the speed of the vehicle.

134. The drive system of 133, further comprising a transitioning motor coupled to the drive assembly to transition at least one of the motor support carriage and the drive assembly.

135. The drive system of 134, wherein the horizontal motion and placement of the drive assembly relative to the transmission unit determines the speed of the drive system and is controlled by a controller coupled to a control input.

136. The drive system of 135, wherein the at least one energy recovery device comprises a first energy recovery device mounted on the motor support plate within the motor assembly.

137. The drive system of 136, wherein the first energy recovery device remains in contact with the weighted drive member at a set distance from a center-point of the weighted drive member.

138. The drive system of 137, further comprising a second energy recovery device.

139. The drive system of 138, wherein the second energy recovery device is driven directly from the motor.

140. The drive system of 138, wherein the second energy recovery device is driven by a gearbox that is driven directly from the motor.

141. The drive system of 139, wherein the second energy recovery device is also engaged while the motor is energized.

142. The drive system of 138, wherein the first energy recovery device is mounted on the motor support carriage.

143. The drive system of 142, wherein the first energy recovery device includes a tractive wheel that moves over the top of the weighted drive member as the weighted drive member returns to its starting position.

144. The drive system of 138, wherein both energy recovery devices can be operated simultaneously with the motor.

145. The drive system of claim 138, wherein said first energy recovery device is attached to the motor support carriage at a fixed distance relative to the center point of the weighted drive member.

146. The drive system of 138, wherein the first energy recovery device is free to move horizontally relative to the weighted drive member.

147. The drive system of 146, wherein the first energy recovery device engages a shaft extending from the motor.

148. The system of claim 125, wherein the the torque plate further comprises a depression section, and the traction member is disengaged when coupled within the depression section and engaged when coupled outside of the depression section.

149. The drive system of claim 74, wherein the at least one energy recovery device is coupled to an at least one accessory energy storage device coupled to an at least one accessory.

* * * * *